United States Patent
Hogg et al.

(10) Patent No.: US 8,272,567 B2
(45) Date of Patent: *Sep. 25, 2012

(54) SYSTEM AND METHOD FOR DISPUTING INDIVIDUAL ITEMS THAT ARE THE SUBJECT OF A TRANSACTION

(75) Inventors: Jason J. Hogg, Orangeburg, NY (US); Patrick Graf, Bellair, FL (US)

(73) Assignee: Serve Virtual Enterprises, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,066

(22) Filed: Feb. 1, 2012

(65) Prior Publication Data

US 2012/0130831 A1  May 24, 2012

Related U.S. Application Data

(63) Continuation of application No. 13/239,191, filed on Sep. 21, 2011, now Pat. No. 8,127,987, which is a continuation of application No. 12/611,665, filed on Nov. 3, 2009, now Pat. No. 8,061,597, which is a continuation of application No. 11/487,139, filed on Jul. 14, 2006, now Pat. No. 7,617,972.

(60) Provisional application No. 60/700,049, filed on Jul. 15, 2005.

(51) Int. Cl.
*G06K 5/00* (2006.01)

(52) U.S. Cl. ............... 235/380; 705/16; 705/24

(58) Field of Classification Search ............... 235/380, 235/383; 705/16, 24

See application file for complete search history.

(56) References Cited

U.S. PATENT DOCUMENTS

| | | | |
|---|---|---|---|
| 4,386,266 | A | 5/1983 | Chesarek |
| 4,408,203 | A | 10/1983 | Campbell |
| 4,797,920 | A | 1/1989 | Stein |
| 4,837,422 | A | 6/1989 | Dethloff et al. |
| 4,906,826 | A | 3/1990 | Spencer |
| 4,908,521 | A | 3/1990 | Boggan et al. |
| 4,943,707 | A | 7/1990 | Boggan |
| 5,177,342 | A | 1/1993 | Adams |
| 5,255,182 | A | 10/1993 | Adams |
| 5,384,449 | A | 1/1995 | Pierce |
| 5,396,624 | A | 3/1995 | Campbell, Jr. |
| 5,557,516 | A | 9/1996 | Hogan |

(Continued)

FOREIGN PATENT DOCUMENTS

JP 2001306976 11/2001

(Continued)

OTHER PUBLICATIONS

Non-Final Rejection for U.S. Appl. No. 12/611,665 dated Sep. 17, 2010.

(Continued)

*Primary Examiner* — Allyson Trail

(74) *Attorney, Agent, or Firm* — Snell & Wilmer L.L.P.

(57) ABSTRACT

A system and method for disputing individual items that are the subject of a transaction includes storing, in a database, a record of a transaction in which a plurality of goods or services were sold to an individual that owns a transaction card through which access to monetary funds may be obtained, so that the transaction is identified by a transaction identifier. Also, information identifying each good or service that is a subject of the transaction is associated with said transaction identifier. A cost associated with one of the goods or services associated with the transaction identifier is disputed, without subjecting costs of all goods or services that are associated with said transaction identifier to dispute.

20 Claims, 18 Drawing Sheets

U.S. PATENT DOCUMENTS

| | | |
|---|---|---|
| 5,692,132 A | 11/1997 | Hogan |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,761,306 A | 6/1998 | Lewis |
| 5,864,830 A | 1/1999 | Armetta et al. |
| 5,878,215 A | 3/1999 | Kling et al. |
| 5,914,472 A | 6/1999 | Foladare et al. |
| 5,953,710 A | 9/1999 | Fleming |
| RE36,365 E | 11/1999 | Levine et al. |
| 5,999,596 A | 12/1999 | Walker et al. |
| 6,018,723 A | 1/2000 | Siegel et al. |
| 6,023,682 A | 2/2000 | Checchio |
| 6,064,990 A | 5/2000 | Goldsmith |
| RE36,788 E | 7/2000 | Mansvelt et al. |
| 6,098,053 A | 8/2000 | Slater |
| 6,119,103 A | 9/2000 | Basch et al. |
| 6,189,787 B1 | 2/2001 | Dorf |
| RE37,122 E | 4/2001 | Levine et al. |
| 6,266,647 B1 | 7/2001 | Fernandez |
| 6,298,336 B1 | 10/2001 | Davis et al. |
| 6,315,193 B1 | 11/2001 | Hogan |
| 6,394,341 B1 | 5/2002 | Makipaa et al. |
| 6,397,194 B1 | 5/2002 | Houvener et al. |
| 6,419,161 B1 | 7/2002 | Haddad et al. |
| 6,473,500 B1 | 10/2002 | Risafi et al. |
| 6,560,581 B1 | 5/2003 | Fox et al. |
| 6,604,107 B1 | 8/2003 | Wang |
| RE38,255 E | 9/2003 | Fisher et al. |
| 6,748,367 B1 | 6/2004 | Lee |
| 6,748,531 B1 | 6/2004 | Epstein |
| 6,793,131 B2 | 9/2004 | Hogan |
| 6,857,566 B2 | 2/2005 | Wankmueller |
| 6,913,194 B2 | 7/2005 | Suzuki |
| 6,915,279 B2 | 7/2005 | Hogan et al. |
| 6,938,013 B1 | 8/2005 | Gutierrez-Sheris |
| 6,957,334 B1 | 10/2005 | Goldstein et al. |
| 6,980,970 B2 | 12/2005 | Krueger et al. |
| 6,990,470 B2 | 1/2006 | Hogan et al. |
| 6,999,569 B2 | 2/2006 | Risafi et al. |
| 7,031,939 B1 | 4/2006 | Gallagher et al. |
| 7,039,809 B1 | 5/2006 | Wankmueller |
| 7,058,611 B2 | 6/2006 | Kranzley et al. |
| 7,089,208 B1 | 8/2006 | Levchin et al. |
| 7,120,608 B1 | 10/2006 | Gallagher et al. |
| 7,146,344 B2 | 12/2006 | Wankmueller |
| 7,177,848 B2 | 2/2007 | Hogan et al. |
| 7,191,151 B1 | 3/2007 | Nosek |
| 7,249,094 B2 | 7/2007 | Levchin et al. |
| 7,252,226 B2 | 8/2007 | Risafi et al. |
| 7,287,695 B2 | 10/2007 | Wankmueller |
| 7,290,364 B2 | 11/2007 | Nelms et al. |
| 7,299,206 B2 | 11/2007 | Taylor et al. |
| 7,299,974 B2 | 11/2007 | Smets et al. |
| 7,318,049 B2 | 1/2008 | Iannaci |
| 7,340,429 B2 | 3/2008 | Maltzman |
| 7,343,335 B1 | 3/2008 | Olliphant |
| 7,356,507 B2 | 4/2008 | Bezos et al. |
| 7,370,011 B2 | 5/2008 | Bennett et al. |
| 7,373,317 B1 | 5/2008 | Kopelman et al. |
| 7,373,319 B2 | 5/2008 | Kopelman et al. |
| 7,373,329 B2 | 5/2008 | Gallagher et al. |
| 7,374,082 B2 | 5/2008 | Van De Velde et al. |
| 7,379,919 B2 | 5/2008 | Hogan et al. |
| 2001/0016827 A1 | 8/2001 | Fernandez |
| 2003/0126094 A1 | 7/2003 | Fisher et al. |
| 2003/0197058 A1 | 10/2003 | Benkert et al. |
| 2003/0236704 A1 | 12/2003 | Antonucci |
| 2004/0103065 A1 | 5/2004 | Kishen et al. |
| 2004/0122754 A1 | 6/2004 | Stevens, III |
| 2005/0086167 A1 | 4/2005 | Brake et al. |
| 2005/0125336 A1 | 6/2005 | Rosenblatt et al. |
| 2005/0127165 A1 | 6/2005 | Currey |
| 2005/0165684 A1 | 7/2005 | Jensen et al. |
| 2006/0020542 A1 | 1/2006 | Litle et al. |
| 2008/0021787 A1 | 1/2008 | Mackouse |

FOREIGN PATENT DOCUMENTS

| | | |
|---|---|---|
| JP | 2004280386 | 10/2004 |
| JP | 2004362554 | 12/2004 |
| WO | 0173652 | 10/2001 |
| WO | 03073226 | 9/2003 |
| WO | 2004111863 | 12/2004 |

OTHER PUBLICATIONS

Final Rejection for U.S. Appl. No. 12/611/665 dated Apr. 15, 2011.

Notice of Allowance for U.S. Appl. No. 12/611,665 dated Jun. 27, 2011.

Letter from Mexican Patent Attorney, Olivares & Cia, summarizing the Office Action issued by the Mexican Patent Office for Mexican Patent Application No. MX/a/2008/000710 dated Jul. 28, 2011.

USPTO; Office Action dated Jun. 30, 2008 in U.S. Appl. No. 11/487,139.

USPTO; Notice of Allowance dated Jul. 7, 2009 in U.S. Appl. No. 11/487,139.

PCT; International Search Report dated Jul. 3, 2008 in Application No. PCT/US2006/027493.

PCT; Written Opinion dated Jul. 3, 2008 in Application No. PCT/US2006/027493.

PCT; International Preliminary Report on Patentability dated Jul. 14, 2009 in Application No. PCT/US2006/027493.

CN; Office Action dated Apr. 2011 in Application No. 200680033605.4.

CN; Office Action dated Nov. 16, 2011 in Application No. 200680033605.4.

MX; Office Action dated Jan. 2012 in Application No. MX/a/2008/000710.

JP; Office Action received Mar. 23, 2012 in Application No. 2008-521663.

SYSTEM AND METHOD FOR DISPUTING INDIVIDUAL ITEMS THAT ARE THE SUBJECT OF A TRANSACTION

CROSS-REFERENCE TO RELATED APPLICATIONS

This application is a continuation of U.S. patent application Ser. No. 13/239,191 entitled "SYSTEM AND METHOD FOR DISPUTING INDIVIDUAL ITEMS THAT ARE THE SUBJECT OF A TRANSACTION" filed Sep. 21, 2011. The '191 application is a continuation of U.S. patent application Ser. No. 12/611,665 entitled "SYSTEM AND METHOD FOR DISPUTING INDIVIDUAL ITEMS THAT ARE THE SUBJECT OF A TRANSACTION" filed Nov. 3, 2009. The '665 application is a continuation of U.S. patent application Ser. No. 11/487,139 entitled "SYSTEM AND METHOD FOR DISPUTING INDIVIDUAL ITEMS THAT ARE THE SUBJECT OF A TRANSACTION" filed Jul. 14, 2006, issued as U.S. Pat. No. 7,617,972 on Nov. 17, 2009. The '139 application claims priority from U.S. Provisional Application No. 60/700,049, entitled "SYSTEM AND METHOD FOR NEW EXECUTION AND MANAGEMENT OF CREDIT TRANSACTIONS," filed Jul. 15, 2005, and which are incorporated herein by reference.

TECHNICAL FIELD

The present invention relates generally to the field of financial and data transaction systems, and more particularly to a system and method of executing financial and data transactions over an open network.

BACKGROUND

FIG. 1 depicts a typical credit card transaction, as it is presently carried out. As represented in FIG. 1, the process begins with a credit card holder 100 providing his credit card to an attendant located at a point-of-sale device (e.g., cash register) within a merchant setting 102, as represented by operation 101. In response, the attendant typically "swipes" the card through a magnetic strip reader that is coupled to the point-of-sale device. Thus, cardholder information, including the name of the cardholder and the credit card number, is transferred from the storage medium on the card to the point-of-sale device.

The point-of-sale device combines the cardholder information with transaction information (including total price of sale and merchant identification), and sends the combined data set to an acquirer or third-party processor 104, as represented by operation 103. The third-party processor 104 responds by forwarding the data set to the card association's (e.g., Visa, American Express, etc.) proprietary transaction network 106 (operation 105), whereby the data set is routed to the issuing bank 108, as shown in operation 107.

Upon reception of the data set, the issuing bank 108 checks the proposed financial transaction against a set of credit rules and either approves or denies the financial transaction. If approved, the approval traverses the identical path, in reverse sequence, (operations 109, 111 and 113) to reach the point-of-sale device at the merchant location 102. Thereafter, the card-issuing bank 108 forwards a monetary sum equal to the sale price to the merchant's bank 110 by way of a similarly complex set of data transactions, as represented by operation 115 (typically, a processor is used as an intermediary that forwards the monetary sum to the merchant's bank 110). At the expiration of the billing period, the cardholder 100 pays the sales price (plus interest and finance charges) to the card-issuing bank 108 (operation 117).

The aforementioned scheme exhibits certain shortcomings. For example, by virtue of using a proprietary network to communicate data between the merchant 102 and the authorizing entity (the card-issuing bank 108, in this case), expense is incurred in the establishment and maintenance of that network. This expense is ultimately borne by the merchant 102. Another disadvantage of the use of a proprietary network is that relatively small amounts of data can be transmitted from the merchant's point-of-sale device, due to infrastructural and cost limitations. This means, for example, that the cardholder cannot be presented with detailed information regarding a given transaction in his monthly statement. In certain circumstance, existing credit card technologies do provide for occasional inclusion of information concerning the content of a given transaction. However, such information is not gathered at a point in time that is contemporaneous with execution of the transaction. It is, instead, gathered well after the execution of the transaction. Given this delay in gathering data, certain advances presented herein are presently not possible in the context of presently existing credit card technologies.

Other shortcomings also inhere in the aforementioned scheme. Personal identification information is typically both printed or embossed on the credit card and encoded on its magnetic strip. This necessitates a delay between the point in time at which a credit card applicant is approved for a credit card and the point in time at which the applicant may receive the credit card (the applicant's personal information is printed and encoded on the card in the intervening period). Additionally, because the storage mechanism used by credit cards is a magnetic strip, a magnetic strip reader must be interfaced with the point-of-sale device. This generates additional expense, which has the tendency to discourage small businesses from accepting such credit cards. Furthermore, there presently exists a movement afoot to introduce radio frequency identification (RFID) devices into credit cards. Such an initiative also involves significant infrastructural investment, which, again, has the tendency to discourage small businesses from accepting such credit cards.

SUMMARY

According to one embodiment, a system includes a point-of-sale device configured to execute a transaction in which a plurality of goods or services is sold to an individual having a transaction card through which access to monetary funds may be obtained. The point-of-sale device gathers information identifying each good or service that is a subject of said transaction and communicates the information to a first computing system. The first computing system stores a set of instructions, which when executed, cause said first computing system to evaluate the transaction to determine whether said transaction is to be authorized. Also, the instructions cause the computing system to store a record of the transaction in a database, so that the transaction is identified by a transaction identifier, and so that the information identifying each good or service that is a subject of said transaction is associated the said transaction identifier. Also, the instructions cause the computing to dispute a cost associated with one of said goods or services associated with said transaction identifier, without subjecting costs of all goods or services that are associated with said transaction identifier to dispute.

According to another embodiment a system includes a point-of-sale device physically located in a merchant store and configured to execute a transaction in which a plurality of goods or services is sold to an individual having a transaction card through which a line of credit is extended. The point-of-sale device gathers information identifying each good or service that is a subject of said transaction and communicates the information to a first computing system. The first computing system stores a set of instructions, which when executed, cause said first computing system to store a record of said transaction in a database, so that said transaction is identified by a transaction identifier, and so that said information identifying each good or service that is a subject of said transaction is associated with said transaction identifier. The instructions also cause the first computing system to dispute a cost associated with one of the goods or services associated with the transaction identifier, without subjecting costs of all goods or services that are associated with the transaction identifier to dispute.

According to another embodiment, a computerized method includes storing, in a database, a record of a transaction in which a plurality of goods or services were sold to an individual that owns a transaction card through which access to monetary funds may be obtained, so that said transaction is identified by a transaction identifier. Also, information identifying each good or service that is a subject of said transaction is associated with said transaction identifier. A cost associated with one of said goods or services associated with said transaction identifier is disputed, without subjecting costs of all goods or services that are associated with said transaction identifier to dispute.

BRIEF DESCRIPTION OF THE DRAWINGS

FIG. 4 depicts an exemplary network environment in which the kernel of

FIG. 5 depicts an exemplary embodiment of a kernel that may be deployed in the exemplary network embodiment of FIG. 4.

DETAILED DESCRIPTION

Figure 1:
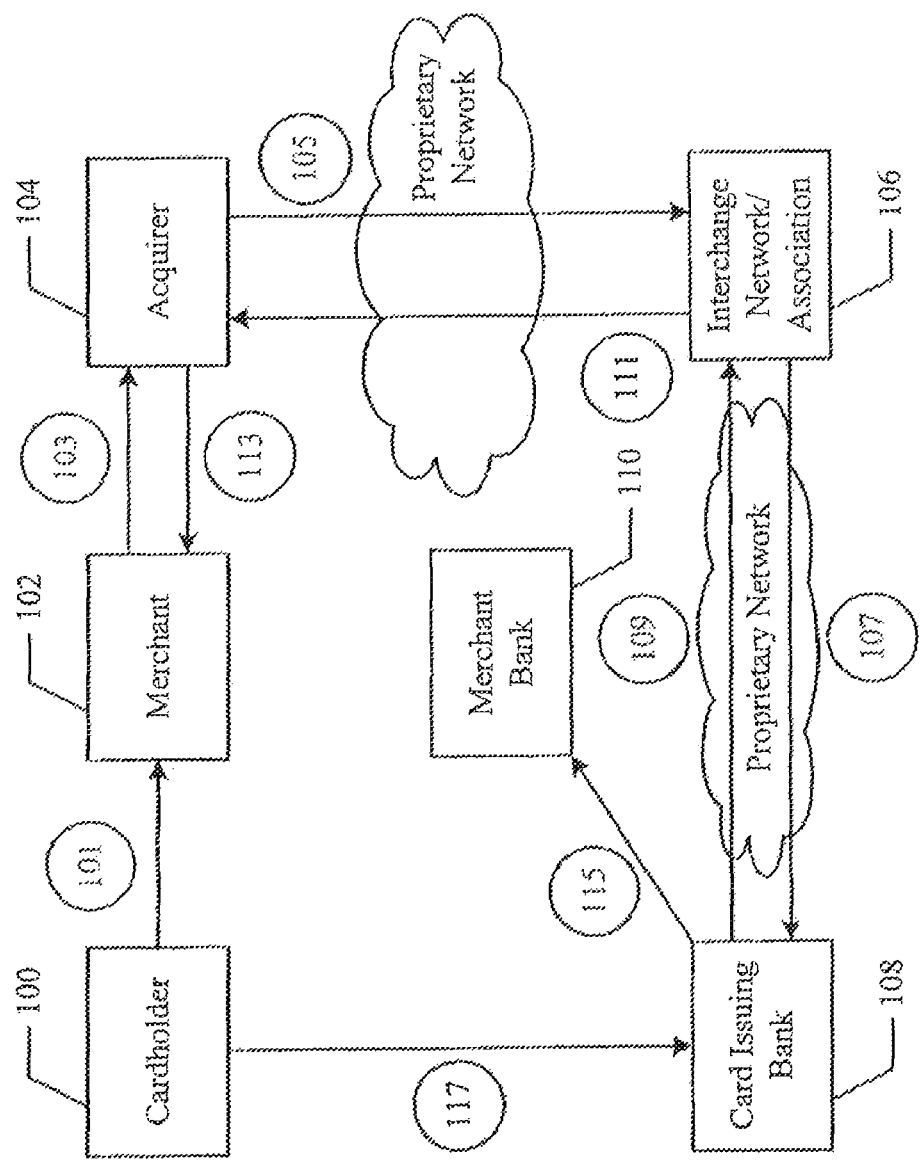
FIG. 1 depicts a typical credit card transaction.

Various embodiments presented herein will be described in detail with reference to the drawings, wherein like reference numerals represent like parts and assemblies throughout the several views. Reference to various embodiments should not be construed as limiting the scope of covered subject matter, which is limited only by the scope of the claims attached hereto. Additionally, any examples set forth in this specification are not intended to be limiting and merely set forth some of the many possible embodiments.

Figure 2:
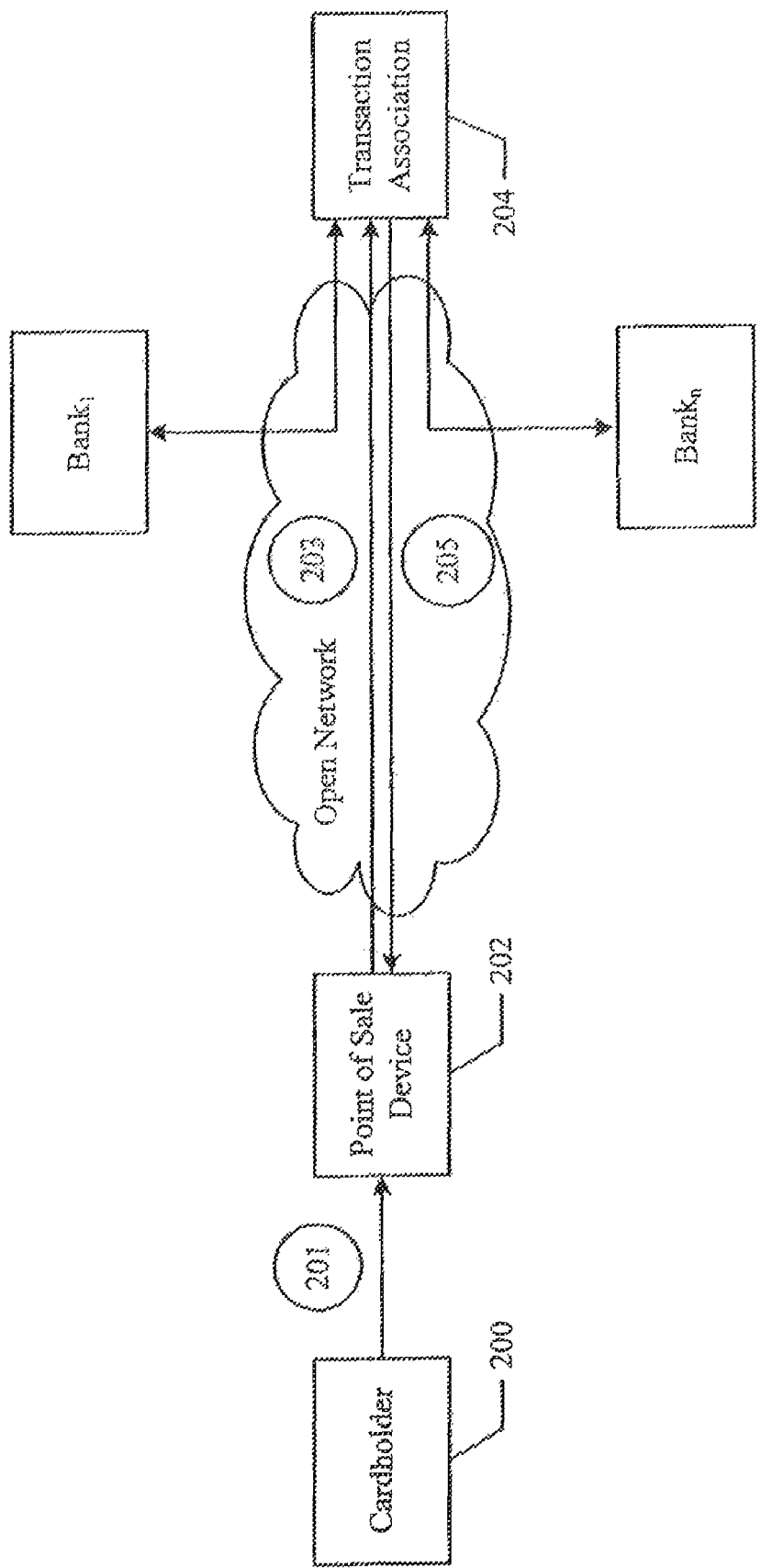
FIG. 2 depicts a credit card transaction, according to one embodiment of the present invention.

FIG. 2 depicts a financial transaction, e.g., credit card transaction, debit card transaction, stored value card transaction, pre-paid card transaction, etc., according to one embodiment of the present invention. As shown in FIG. 2, a cardholder 200 initiates the transaction by presenting a credit card to a point-of-sale device 202 or to an attendant operating such a device 202 (operation 201). Of course, the transaction may be initiated in the course of an ordinary online transaction, such as by virtue of entry of cardholder information into a web site designed for online commerce. For the sake of illustration only, the transaction as described with reference to the figures herein is described as occurring at a point-of-sale device (at a merchant store) manned by an attendant. Also, the card may be referred to herein as a "credit card," "card," or "transaction card" for the sake of familiar reference. In fact, as discussed below, the card may operate as a credit card, a debit card, a stored value card, and/or a data access card that permits access to various forms of data, such as health care data, club membership data, etc.

The card may exhibit the following characteristics. The card, itself, may include a substrate (i.e., the body of the card), which may be polymeric or of any suitable material. A storage medium may be disposed upon, embedded within and/or printed upon the substrate. The storage medium may be read-only, such as a bar code printed upon the substrate, or may be readable and writable, such as a magnetic storage medium (e.g., magnetic strip). According to some embodiments, the credit card may have both a bar code and a magnetic strip thereon. According to some embodiments, a card number uniquely identifying the card is encoded upon the magnetic strip and/or upon the bar code. Also, the credit card may include an RFID device having a card number stored therein. According to one embodiment, the storage medium, whether it be a bar code, magnetic strip, or RFID device contains, encodes, and/or stores no personal information concerning the cardholder. According to some embodiments, the storage medium(s) on the card encodes, contains, and/or stores only a card number uniquely identifying the card. According to some embodiments, the storage medium(s) of the card contains, encodes, and/or stores no personal identification number (PIN).

Upon receiving the card, the attendant provides the card to an input device, such as a bar code reading device, magnetic strip reader, or RFID transceiver. The information encoded on the storage medium of the credit card is then read. Next, the cardholder may be prompted for a personal identification number (PIN), which may be entered into the point-of-sale device, either by the cardholder or by the attendant, through an appropriate input device, such as a keypad, keyboard, a touch-screen display, and/or any device suitable for entry of a PIN. The data from the credit card, the PIN, and transaction information from the point-of-sale device are used to populate a plurality of data packets, which may be "packaged" as a single unit that constitutes a request for authorization of a proposed transaction. The various packets are discussed in more detail herein, below. The packaged unit is encrypted according to a scheme generally described below, and is transmitted across an open network, such as the Internet, to the transaction platform 204, as shown in operation 203.

As described in greater detail herein, the transaction platform 204 may maintain a degree of integration with the card-issuing bank, so as to be able to authorize or deny all, most, or some transactions (e.g., transactions less than a threshold dollar amount), without necessitating further communication to the card-issuing bank to arrive at an authorization decision. After arriving at an authorization or denial decision, the authorization/denial is returned via the open network (e.g., the Internet) to the merchant 202, as shown in operation 205.

The above-described embodiments exhibit certain advantages that are of note, but are not essential for practice of the various embodiments described herein. For example, communication between the merchant 202 and the transaction platform 204 occurs via an open network, such as the Internet. By making use of an open network, the need for proprietary network elements and/or lines is eliminated and/or reduced, meaning that the cost of executing each transaction is reduced. Also, because communication via an open network such as the Internet is free of charge, a relatively greater quantity of data may he exchanged between the merchant 202 and the transaction platform 204, allowing for greater resolution in billing statements, as described below. Moreover, the administration of bank rules as defined by a bank, such as available credit, interest charges and fees are managed by the platform, reducing the need for constant communication between the information association 202 and the various card-issuing banks 206, which is conducted through scheduled system consolidation/synchronization, which may also he conducted via the open network, thereby reaping the same benefits.

Figure 3:
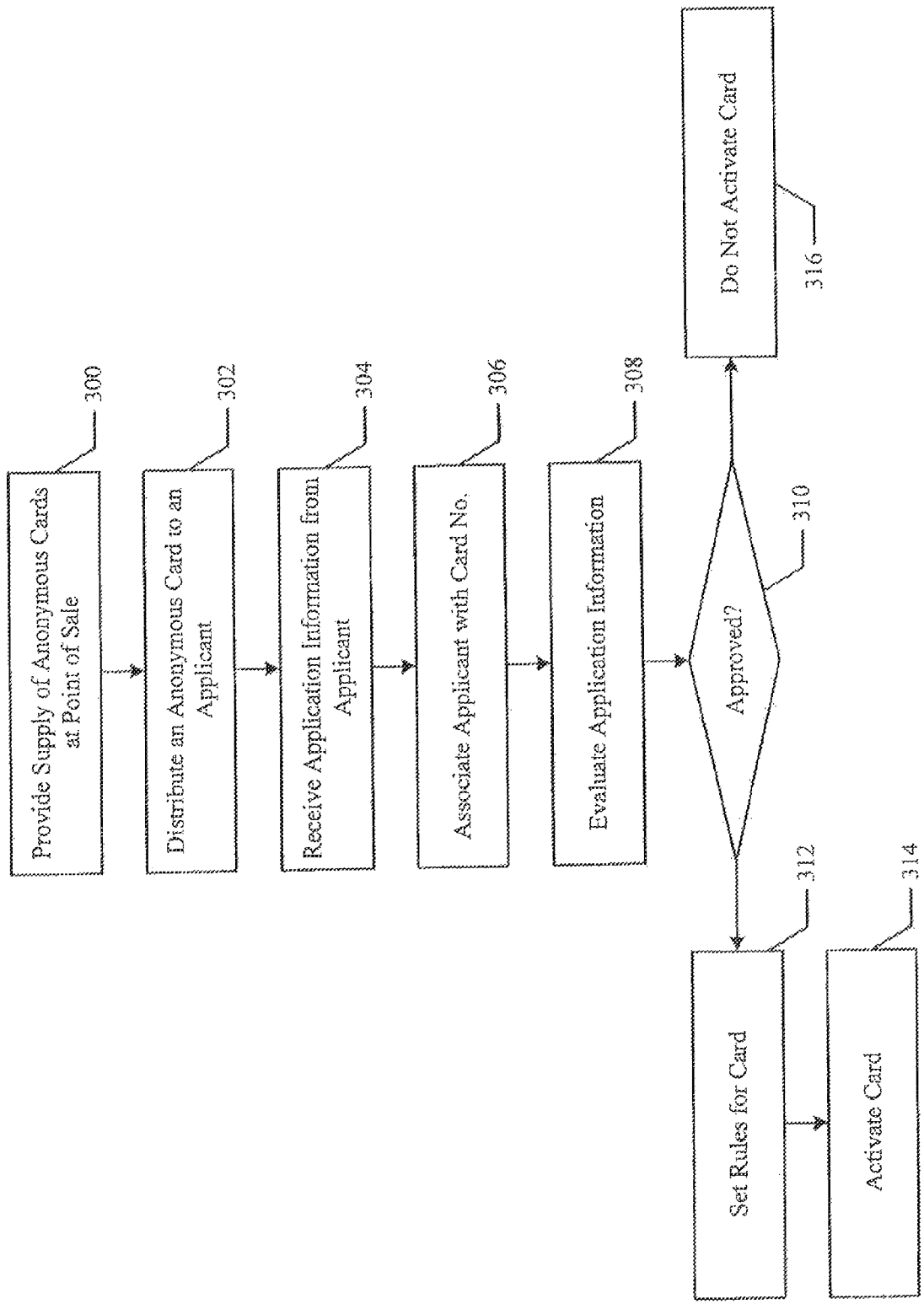
FIG. 3 depicts a method by which a transaction card may be activated almost simultaneously with the point in time at which an application associated therewith is approved.

Also of note is that, in some embodiments, the credit card contains no personal information. Specifically, no personal information is printed, embossed, or otherwise presented on the face of the card (e.g., the card does not bear the name of the cardholder), nor is personal information encoded upon, stored within, or contained in the storage medium on the card. This arrangement permits near-instantaneous placement of an activated transaction card in the hands of a would-be cardholder. For example, as shown in FIG. 3, a supply of unassigned, anonymous cards may be provided at, for example, a point-of-sale device at a merchant store (operation 300). By "anonymous," it is meant that the card contains, encodes, and/or stores no information identifying an individual to whom the card belongs. In other words, it does not bear the name of an individual on its surface, nor does it have the name or other identifying information concerning an individual stored or encoded on a storage medium of the card. The storage medium of the card may contain only a card number that uniquely identifies the card, not the account number.

As shown in operation 302, an anonymous card is distributed to an applicant. This may occur, for example, at a point in time at which a customer is about to transact a purchase of a good or service. Assuming that a source of unassigned, anonymous cards is maintained at a point-of-sale device, an attendant thereat may ask a customer if he or she would like to apply for a credit card or open a pre-paid/stored value card. If the customer answers in the affirmative, then the attendant may supply the customer with a card. Of course, a would-be applicant may obtain an anonymous card from any source, including from friends or other cardholders (discussed below).

Next, the transaction platform's server (discussed in detail, below) is provided with the applicant's application information and the card number uniquely identifying the card (operation 304). Assuming once again that the anonymous card is distributed to a customer at a point-of-sale device, the customer's application information may be entered by the attendant into the point-of-sale device, whereupon it is communicated via a network, such as the Internet or telephone network, to the transaction platform's server. Additionally, the application information may be received by an employee of the transaction platform (e.g., via a telephone call with the applicant), and may he entered into the server by the employee (or may be entered into a computer in communication with the server). Still further, the applicant may be directed to a web page or an in-store kiosk (e.g., the card may bear the web address of a web page) that is structured to permit entry of application information. The applicant may directly enter his or her application information into the web page, thereby communicating his or her application information to the server, in general, the application information may be received by the server in any manner.

The application information, itself, may include the information typically necessary to conduct a credit check, in order to determine the credit worthiness of an individual. For example, such information may include identifying information, such as the name, address, telephone number, and/or social security number of the applicant, and may also include employment information such as place of business, number of years worked at such place of business, etc. The application information may constitute a minimal set of information needed for the server to properly handle financial transactions for the applicant. According to some embodiments, the server has access to a database that may store a wide variety of information concerning the applicant. Such information may include health information, emergency contact information, family information, etc. (these other forms of information are discussed below). At the time that the application information is received, the aforementioned other forms of information may not be received by the transaction platform's server. Thus, the server uses the application information to populate one or more tables in the aforementioned database relating to the applicant's application, and also minimally populates other tables relating to the applicant and to other matters. If the application is ultimately approved, other types of information may be collected from the applicant/cardholder at a later time, and the various tables of the database may be more fully populated.

After receiving the application information, the server enters information in the database to associate the applicant's card number with the applicant's application information (operation 306). Thereafter, an evaluation of the application is performed (operation 308). According to some embodiments, a credit check may be performed upon the applicant. The application information may include a sufficient quantity of information to query a credit score service (example: Fair Issaac. Co.) to obtain a credit score for the individual (example: FICO score). For example, the information association's server may communicate, via a network such as the Internet, with a credit score service to determine a credit score associated with an individual. If the credit score exceeds a particular threshold, then the application is approved, otherwise it is declined. According to other embodiments, the applicant's application information is communicated via a network such as the Internet to one or more card-issuing banks. Each card-issuing bank individually uses the application information to perform their own analysis and independently conclude whether to deny or approve the application. According to some embodiments, the transaction platform's server compares the credit terms offered by the approving card issuing banks, and selects the card-issuing bank offering the best credit terms as the bank associated with the card number. According to other embodiments, each card-issuing bank may communicate a bid, e.g., a monetary sum it is willing to pay to the transaction platfrom to acquire the account, and the transaction platform may select the bank offering the highest bid, for example. According to other embodiments, more than one hank may be associated with the card number, and the applicant/future cardholder is permitted to select from among the banks for extension of credit, with each purchase.

Irrespective of how the analysis is conducted, if the evaluation indicates that the application is approved, then the server enters information into the database to associate rules with the applicant's card, as shown in operation 310. For example, a spending limit determined based upon the credit score may he associated with the card (or, the card-issuing bank may determine the limit and communicate the limit to the transaction platform's bank), generic anti-fraud data may also be associated with the card, etc, (operation 312). Thereafter, the card may be activated (operation 314), meaning that the card may he used to execute a transaction, e.g., may be used to purchase a good or service on credit (or, as discussed below, may he used in another manner, such as to transact a purchase as a debit card, stored value card, etc.). To facilitate execution of a transaction, the PIN assigned to the transaction card is communicated to the approved applicant. For example, the PIN may be communicated to the cardholder via a short message service message, via an e-mail received by a wireless or other device, via the point-of-sale device, etc. This PIN may he either a permanent PIN, or may he active for only a particular period of time, for a particular number of uses, on in connection with transaction having a monetary value of less than a particular amount.

If, on the other hand, operation 310 indicates that the application is declined, then the card is not activated (316), meaning that the card may not he used to execute a transaction.

Operations 300-314 may be carried out nearly instantaneously. For example, according to some embodiments, operations 300-314 may he carried out within less than one minute, and according to other embodiments such operations may be carried out in less than 30, 15, and/or 5 seconds. Thus, for example, an applicant may apply for a card while initiating a purchase at a point-of-sale device at a merchant store, and may actually have the card activated, so that the applicant can use the card to transact that purchase (and other purchases at other merchants, as well). Because the card is anonymous, there is no need for the card to bear printing identifying the cardholder, nor is there a need for the storage medium of the card to have such identification information or PIN encoded therein. Thus, utter the application process, there exists no waiting period for the card to he printed upon or for the storage medium thereof to be encoded with information identifying the applicant.

Figure 4:
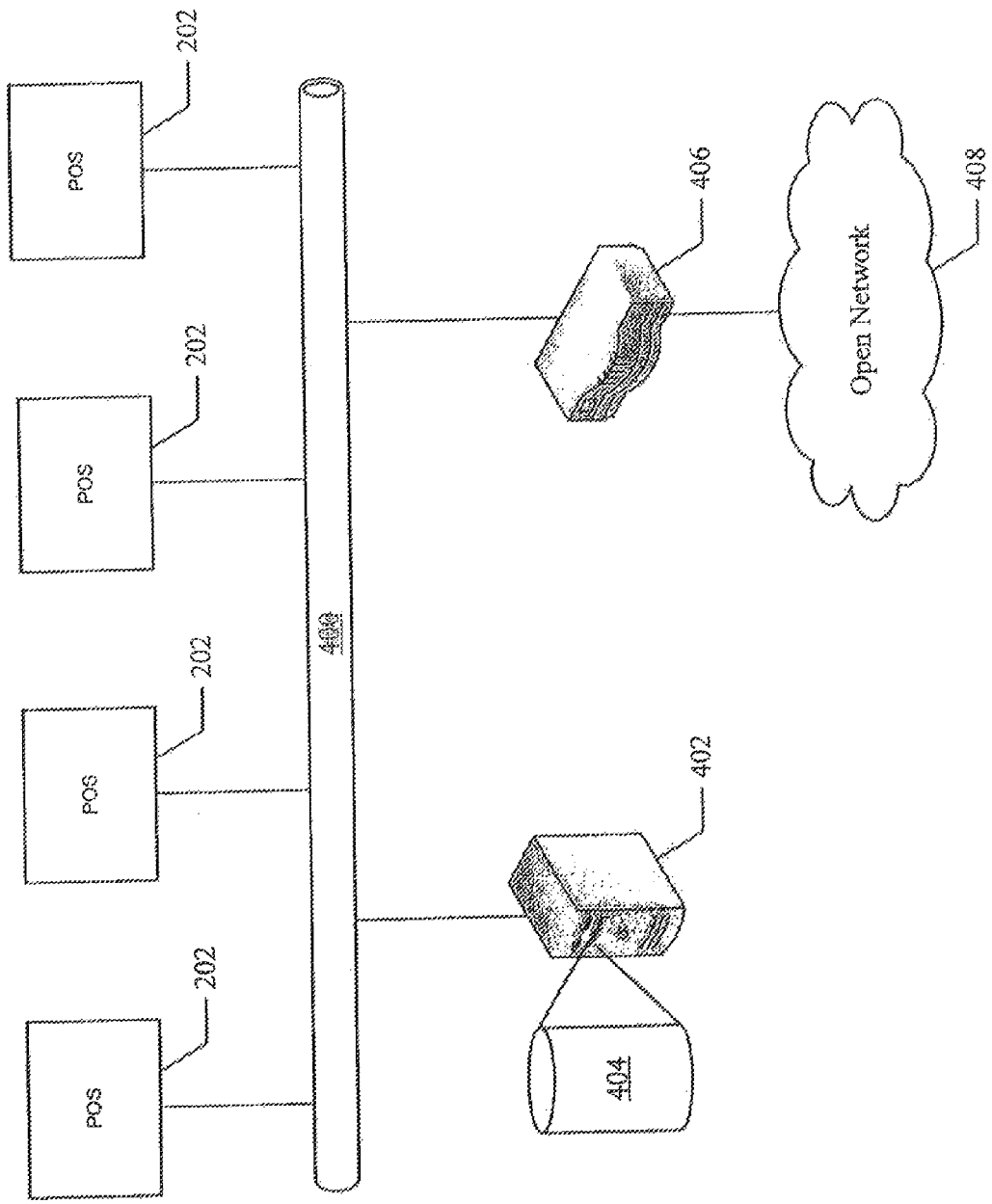

As described with reference to FIG. 2, to transact a purchase using the transaction card described herein, a point-of-sale device (e.g., cash register) may read a given card, and may communicate the information via an open network to the transaction platform's server. FIG. 4 depicts an exemplary networking environment in which the point-of-sale device 202 of FIG. 2 may reside. As can be seen from FIG. 4, a given merchant store may have a plurality of point-of-sale devices 202 situated therein. Each point-of-sale device 202 may be coupled to a local area network (LAN) 400. The LAN of FIG. 4 is depicted as being an Ethernet network, for the sake of illustration only. The LAN 400 may be of any structure and utilize any protocol.

The various point-of-sale devices 202 communicate with a server 402 via the LAN 400. The server 402 maintains a database 404 that stores information regarding all of the transactions conducted via each of the point-of-sale devices 202. (Typically, each transaction is identified by a transaction identifier, as discussed below). The server 402 may transfer information to/from an open network 408, such as the Internet, via a router 406.

Figure 5:
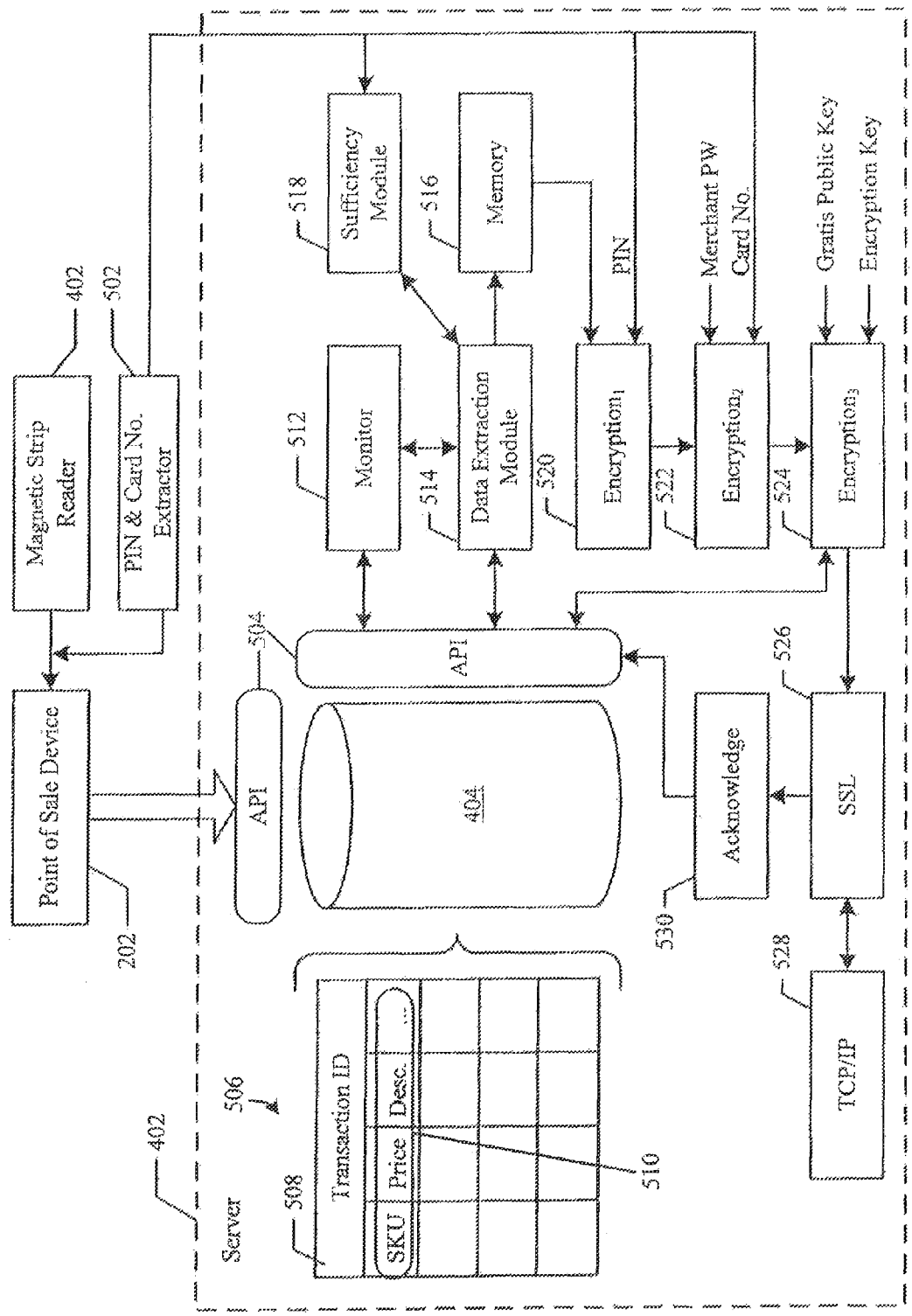
FIG. 5 may be deployed.

The network environment of FIG. 4 is exemplary, and presented for the sake of illustration only. Many other environments exist and are known by those of ordinary skill in the art. FIG. 5 depicts a transaction kernel that is deployed, i.e., the various software units are stored and executed at, either the point-of-sale devices 202, the server 402, some combination of the two, and/or any computing device in communication with either the point-of-sale devices and/or server 402. Herein, the kernel of FIG. 5 is discussed proceeding from the assumption that it is deployed in the network environment of FIG. 4, but its modules are adaptable to use in any networking environment, as understood by one of ordinary skill in the art.

Turning to FIG. 5, the point-of-sale device 202 is coupled to an input device 500, such as a magnetic strip or bar code reader, or RFID transceiver. During the transaction of a purchase, the magnetic strip reader 500 is used to read the magnetic strip on the card. Of course, if the storage medium of the card is a bar code, then the input device 500 may be embodied as a bar code scanner. Similarly, if the storage medium of the card is an RFID chip, then the input device 500 may be embodied as an RFID transceiver. When the input device 500 reads the storage medium of the card, a card number uniquely identifying the card is read therefrom. The input device 500 may also include a keypad, which may be used by the cardholder to enter a personal identification number (PIN). The PIN code and card number are communicated from the input device 500 to the point-of-sale device 202.

A point-of-sale device 202 has the structure of a general-purpose computing device. In other words, the point-of-sale device 202 includes the components typically found in a general-purpose computer, i.e., it includes a processor that is coupled to one or more stages of memory that store software and data. The processor communicates, via an input/output (I/O) bus, with various input, output, and communication devices, including a display, such as a monitor, and may communicate with a keyboard, a mouse or other pointing device, such as a touch pad, and/or speakers, to name a few such devices. Various peripheral devices may also communicate with the processor via the I/O bus, including a network interlace card, a hard disc drive, or other mass data storage device, removable media drives, such as a CD ROM drive or a DVD drive (which may be both readable and writable), a wireless interface, a magnetic strip reader, a barcode reader, an RFID transceiver, etc. It is understood that computers presently employ many chip sets and architectures. The point-of-sale device 202 broadly represents all such chip sets and architectures, and the various embodiments of the kernel and various software methods described herein may execute on all such chip sets and architectures.

A PIN code and card number extractor module 502 may be resident in the memory of the point-of-sale device 202 or in any other device in communication therewith and/or networked thereto, and is executed by the processor thereof. By "module," it is meant a unit or portion of software, such as a function, object, set of functions and/or objects, and/or a set of computer instructions (e.g., machine code) executable by the processor of the point-of-sale device 202. Of course, the functionality provided by a module may also be employed by the cooperative efforts of one or more application-specific integrated circuits (ASICs), or by the cooperative efforts of one or more ASICs and modules of software stored in a memory device and executed by a processor. Upon the input device 500 communicating the PIN code and card number to the point-of-sale device 202, the extractor module 502 reads the card number and the PIN code from the data set communicated from the input device 500 to the point-of-sale device 202. As discussed below, the extractor module 502 communicates the PIN code and card number information to other software modules that may, according to some embodiments, be stored and executed by the server 402.

The point-of-sale device 202 communicates with a database 404 that is managed by the server 402. An application interface (API) 504 is provided to permit the point-of-sale device 202 to interact with the database 404. According to some embodiments, the database 404 is organized according to a schema including a plurality of tables structured to store information concerning the items that have been sold at the store. The database 404 may store other information, as well. For example, if the particular merchant operates many stores, the database 404 may store information concerning the items that have been sold at all of the merchant's stores, or all of the merchant's stores within a region. Further, the database 404 may store information relating to merchandise inventory, supplier information, and other information useful in operating the particular business. Like the network structure of FIG. 4, the schema of the database 404 varies from merchant to merchant and may vary from store to store, as is understood by one of ordinary skill in the art.

Although the schema employed by the database 404 may vary from merchant to merchant, it is customary for the database to include a table that stores records describing the details of each transaction. Such a table is described herein as a "transaction table" 506. A transaction table 506 is typically organized to uniquely identify each transaction with a transaction identifier 508, i.e., the transaction identifier 508 may be the primary key for the transaction table 506. A plurality of fields 510 may be associated with each transaction identifier 508. These fields 510 provide for storage of information concerning each item included in the transaction. For example, the fields may include one or more of the following: (1) a stock keeper unit (SKU) number of each item included in a transaction; (2) the price of each item included in the transaction; (3) an internal description of each item included in the transaction; (4) an external description of each item included in the transaction; (5) a general description of each item included in the transaction; (6) a category into which each item included in the transaction falls; (7) the sales tax associated with each item included in the transaction; (8) the date on which the transaction occurred; (9) the time at which the transaction occurred; (10) an identifier indicating the particular store at which the transaction occurred; (11) an identifier indicating the particular point-of-sale device at which the transaction occurred; (12) an identifier indicating the employee operating the particular point-of-sale device at the date and time of the transaction; (13) an indication of the method of payment used to transact the particular transaction, e.g., cash, credit card, etc.; (14) the total price of the transaction; (15) an indicator of the type of transaction, e.g., purchase, refund, return, data inquiry, etc.; and/or (16) any other information describing the subjects and/or circumstances of the transaction. Information generally of the variety just recited, i.e., information going beyond the total price, date, time, and/or location (e.g., identification of merchant and city/state) of the transaction, is referred to as "level three data,"

After a point-of-sale device 202 has scanned each item involved in a transaction, a payment technique may be selected. The point-of-sale device 202 may present a screen inquiring as to the type of transaction to be executed via the transaction card, e.g., whether the card is to he used as a credit card, a debit card, and/or as a stored value card (as mentioned previously, the transaction card may be used as a credit card in the context of one transaction, as a debit card in another transaction, and as a stored value card in the context of yet another transaction). The point-of-sale device 202 uses the API 504 to create a new transaction identifier 508 to uniquely reference the transaction it is executing. The transaction type and level three data concerning the transaction may then be stored in the transaction table 506 in association with the transaction identifier 508. According to some embodiments, the PIN and card number extractor 502 also captures the transaction type, and delivers the transaction type data to the second encryption module 522, as discussed below.

A monitor module 512 interacts with the API 504 to observe the creation of a new transaction identifier 508 within the transaction table 506. Upon observation of the creation of a new transaction identifier 508, the monitor module 512 calls the data extraction module 514 to initiate its operation.

According to some embodiments, the data extraction module 514 interacts with the API 504 to extract the level three data, including the transaction identifier, associated with the new transaction. According to other embodiments, the data extraction module 514 interacts with the API 504 to extract less than the full extent of the level three data. For example, the data extraction module 514 may obtain only the transaction identifier and total price of the transaction from the database 404. For the sake of illustration only, the present document describes the data extraction module 514 as obtaining the full extent of the level three data from the database 404.

To permit the data extraction module 514 to obtain data from the database 404, at the time of installation of the kernel depicted in FIG. 5, the data extraction module is supplied with information permitting such extraction. For example, the code and/or data space of the data extraction module 514 may be altered in light of the name of the transaction table 506, and the names of the various fields 510 therein from which it is to capture data.

As the data extraction module 514 captures the level three data, it is entered into a region of memory 516 for transfer to a first encryption module 520. Prior to transfer of the first encryption module 520, a sufficiency module 518 examines the captured data and interacts with the PIN and card number extractor 502 to ensure that: (1) the data extraction module has captured at least a total price and a transaction identifier; and (2) the PIN and card number extractor 502 has captured the card number and PIN. If the aforementioned data has not been captured, an error is indicated, and operation of the kernel vis-à-vis the transaction is halted. If, on the other hand, the aforementioned data has been captured, then the data stored in the memory 516 is passed to the first encryption unit 520.

Figure 6:
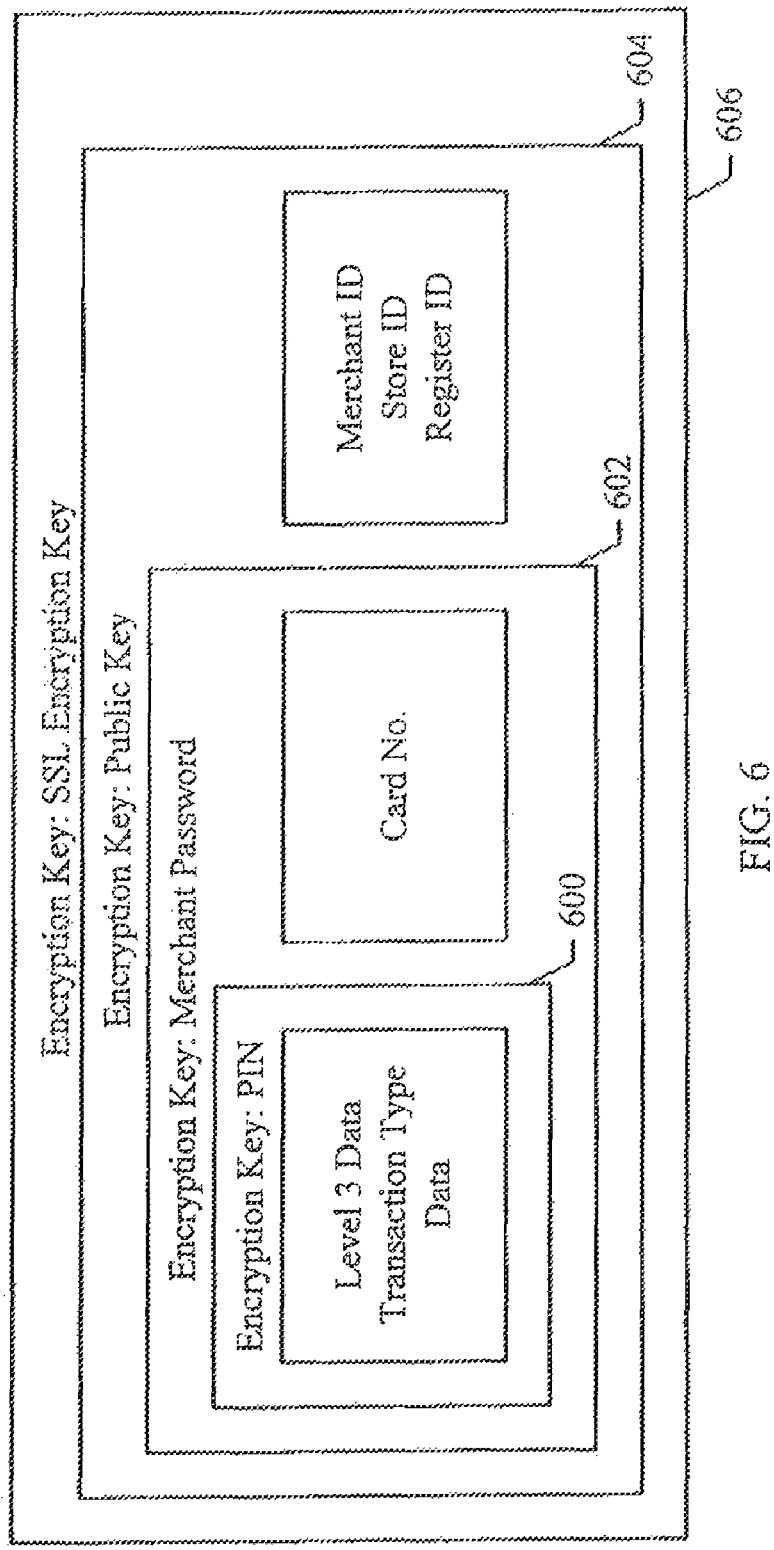
FIG. 6 depicts an exemplary embodiment of a message communicated from the kernel of FIG. 5 to the software system of FIG. 7.

The first encryption unit 520 encrypts the level three data and the transaction type data (transaction type data is received from the PIN and card number extractor 502, as shown in FIG. 5) using the PIN captured by the PIN and card number extractor 502 as the encryption key, thereby creating a first encrypted object 600. The first encrypted object 600 is depicted in FIG. 6. The first encrypted object 600 is passed from the first encryption module 520 to the second encryption module 522.

The second encryption module 522 receives the first encrypted object 600 and appends the card number thereto, creating an appended data set. (The card number is received from the PIN and card number extractor 502, as shown in FIG. 5). Then, a merchant password is used as a key to encrypt the appended data set, thereby obtaining a second encrypted object 602. The second encrypted object 602 is depicted in FIG. 6. The second encrypted object 602 is passed from the second encryption module 522 to the third encryption module 524. According to some embodiments, the merchant password is a 64, 128, 256, 512-bit value, or a value of another length appropriate to protect the second encrypted object 602 from being decrypted by an interloper, when transmitted along an open network. The merchant password typically remains a secret known only to a select set of necessary employees at the merchant and at the transaction platform. According to some embodiments, the merchant password is entered into the code and/or data space of the kernel at the time of installation of the kernel on the merchant's server 402.

The third encryption module 524 receives the second encrypted object 600 and appends a merchant identifier, a store identifier, and a point-of-sale device identifier thereto, thereby creating an appended data set. The merchant identifier is a value uniquely identifying the merchant (e.g., a value indicating that the transaction occurred at a Target store). The store identifier is a value that uniquely indicates the particular store at which the transaction is taking place (e.g., a value indicating at which Target store the transaction is occurring). The point-of-sale device identifier is a value that uniquely identifies the particular point-of-sale device 202 at which the transaction is occurring (e.g., a value indicating at which cash register the transaction is occurring). The merchant identifier, a store identifier, and a point-of-sale device identifier are obtained from the database 404, via the API 504. According to some embodiments, at the time of installation of the kernel of FIG. 5 upon a merchant's server 402, the name of the table(s) and fields within the database 404 containing such information is entered into the third encryption module 524 (e.g., entered into the code and/or data space of the third encryption module 524), so that it can interact with the API 504 to obtain such information. The third encryption module 524 then encrypts the appended data set with a public key associated with the transaction platform 204, yielding the transport object 604. The transport object 604 is depicted in FIG. 6. According to some embodiments, the public key is a 64, 128, 256, or 512-bit value, or a value of another length appropriate to protect the transport object 604 from being decrypted by an interloper, when transmitted along an open network. The transport object 604 is passed to a secure socket layer (SSL) module 526, along with an SSL encryption key for use by the SSL module 526. According to some embodiments, the aforementioned SSL encryption key is generated by a random number generator, and the public key may be directly hard-coded into the third encryption module 524.

The SSL module 526 receives the transport data object 604 and uses the SSL encryption key to encrypt the transport object, yielding an encrypted transport object 606. The encrypted transport object 606 is depicted in FIG. 6. Although FIG. 5 depicts the SSL encryption key as being generated by a random number generator in the third encryption module 524, according to other embodiments, the SSL encryption key may be generated by the SSL module 526.

The SSL layer 526 passes the encrypted transport object to the transmission control protocol/internet protocol (TCP/IP) module 528 for communication through the open network 408 to the transaction platform's server. (According to the exemplary network environment of FIG. 4, the transport object is communicated as one or more packets routed through the router 406 to the open network 408.)

Figure 7:
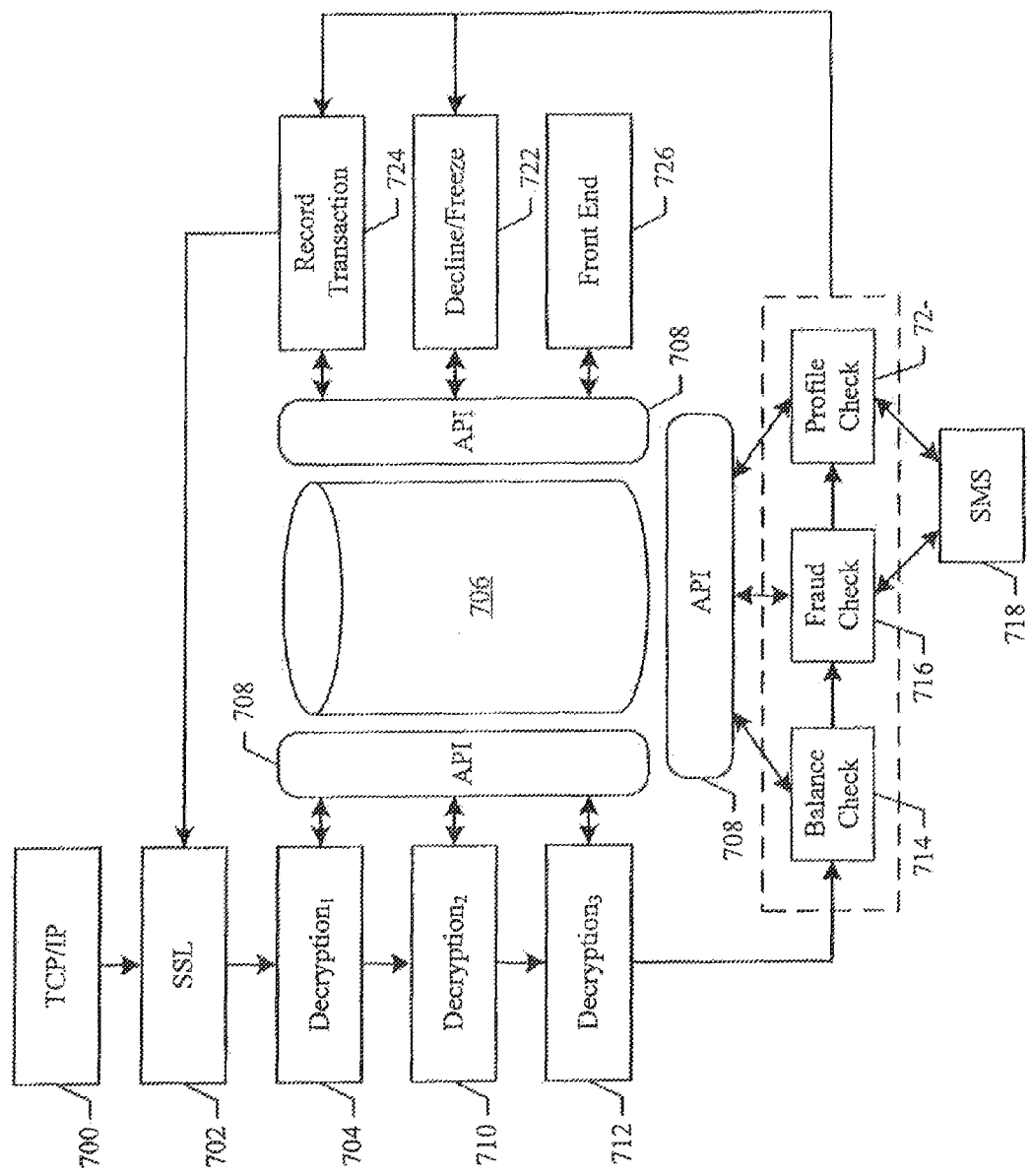
FIG. 7 depicts an exemplary embodiment of a software system that may be executed by one or more servers operated by a transaction platform.

An exemplary embodiment of a software system executing on the transaction platform's server is depicted in FIG. 7. The transaction platform's server is structured so as to include at least similar elements as a general-purpose computing device. In other words, the transaction platform's server includes the components typically found in a general-purpose computer, i.e., it includes a processor that is coupled to one or more stages of memory that store software and data. The processor communicates, via an input/output (I/O) bus, with various input, output, and communication devices, including a display, such as a monitor, and may communicate with a keyboard, a mouse or other pointing device, such as a touch pad, and/or speakers, to name a few such devices. Various peripheral devices may also communicate with the processor via the I/O bus, including a network interface card, a hard disc drive, or other mass data storage device, removable media drives, such as a CD ROM drive or a DVD drive (which may be both readable and writable), a wireless interface, a magnetic strip reader, a barcode reader, an RFID transceiver, etc. It is understood that servers presently employ many chip sets and architectures. Throughout this document the transaction platform's server is referred to in the singular, i.e., as though it is a singular machine. Of course, the server may actually be composed of a plurality of servers that cooperate to perform the functionality described herein. For example, two or more servers may individually perform all of the functionality described herein, and they may handle clients (i.e., various transaction kernels installed at various sites), as assigned by a load balancer. Also, two or more servers may cooperate in the sense that a first server may perform a subset of the operations described herein, and may communicate with a second server that performs another subset of the operations described herein.

The description of the functionality of FIG. 7 is provided with reference to a credit transaction, for the sake of illustration only. As discussed herein, below, the same infrastructure may be used to process debit transactions, stored value transactions, data access transactions, and combinations thereof.

The software system of FIG. 7 includes a TCP/IP module 700 that receives one or more packets, the combined payload of which make up the encrypted transport object 606. The TCP/IP module 700 reconstitutes the encrypted transport object 606 from the one or more packets, and passes the encrypted transport object 606 to the SSL module 702. The SSL module 702 uses the SSL encryption key to decrypt the encrypted transport object, yielding the transport data object 604. (The SSL module 702 has access to the SSL encryption key by virtue of the negotiation that initiated the secured SSL session, as is understood by those of ordinary skill in the art). The transport data object 604 is then passed to the first decryption module 704.

The first decryption module 704 has access to a database 706 via an API 708. The database 706 contains financial data for each cardholder, and other data, as well as described in greater detail, below. According to some embodiments, the first decryption module 704 accesses the database 706 to obtain the transaction platform's private key, and then decrypts the transport object 604, yielding the second encrypted object 602 and the appended merchant identifier, store identifier, and register identifier. According to other embodiments, the first decryption module 704 has the aforementioned private key hardcoded into its code space, or accesses the private key from a region of memory. In any case, the second encrypted object 602 and the appended merchant identifier, store identifier, and register identifier is passed to the second decryption module 710.

The second decryption module 710 also has access to the database 706 via the API 708. The second decryption module 710 uses the merchant identifier that is passed to it from the first decryption module 704 to obtain the merchant password. For example, the merchant identifier may he used as a key to access a table in the database 706 to find the merchant password. Thus, the second decryption module 710 may access a table that relates the merchant identifier to the merchant password, and may use the merchant identifier as a key to obtain the merchant password. The merchant password is then used to decrypt the second encrypted object 602, yielding the first encrypted object 600 with the card number, merchant identifier, store identifier, and register identifier appended thereto. The first encrypted object 600 and the aforementioned appended data are passed to the third decryption module 712.

The third decryption module 712 receives the just mentioned data, including the card number, and accesses the database 706 via the API 708. The third decryption module 712 uses the card number to obtain the card identifier and PIN from the database 706. The card number may be used as a key to access a table relating the card number to a card identifier and, either directly or indirectly, to the PIN. For example, the card number may be used to access a table that associates the card number to a card identifier and a PIN code identifier. Then, using the PIN code identifier, a table relating the PIN code identifier to the PIN may he accessed, in order to obtain the PIN. As one of ordinary skill in the art understands, the PIN may he stored in an encrypted format, so that it cannot he misappropriated. Upon retrieval from the table in which it is stored, the PIN is decrypted, assuming that the requesting task has a proper access level to request such decryption. Upon receiving the PIN, the third decryption module 712 decrypts the first encrypted object 600, yielding the level three data, together with the card number, merchant identifier, store identifier, and register identifier. (Of course, as discussed with reference to FIG. 5, the payload of the first encrypted object 600 may, in some instances, only include the total price and a transaction identifier.)

The aforementioned data is passed to the balance check module 714, which, like the various decryption modules 704, 710, and 712, has access to the database 706 via the API 708. First, the balance check module 714 obtains the current balance and credit limit associated with the card number from the database 706. For example, the balance check module 714 may access a table containing relating card detail information to a card identifier. Then, using the card identifier, which was obtained by the third decryption module 712, as a key to look up the current balance and credit limit values are obtained. The sum of the current balance and total price of the proposed transaction is compared with the credit limit. If the sum exceeds the credit limit, the proposed transaction may be declined (discussed later, below). Otherwise, process flow is passed to the fraud check module 716.

Figure 8:
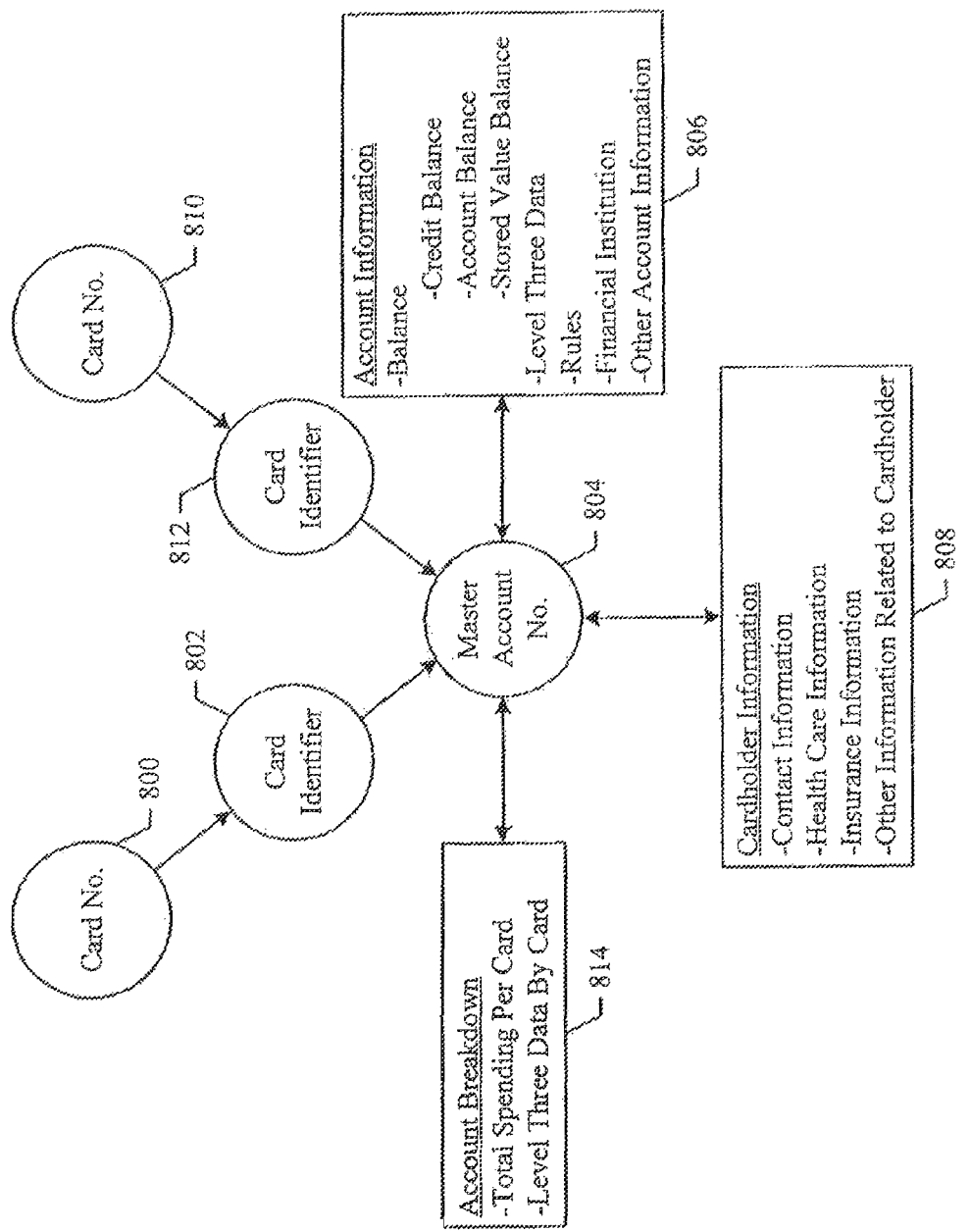
FIG. 8 depicts an exemplary embodiment of a schema implemented by the database of FIG. 7.

The fraud check module 716 has access to the database 706 via the API 708. The fraud check module 716 obtains fraud indicator rules associated with the card number from the database 706. According to some embodiments, some or all of the rules may be determined by the cardholder (this is discussed below). Also, some or all of the rules may he system rules that are generated without input from the cardholder. The parameters of the proposed transaction and recent transactions may he compared with the fraud indicator rules, if one of the fraud indicator rules tests positive, the cardholder may be contacted. The cardholder may be contacted via the telephone by an employee of the transaction platform (note that the cardholder's contact information, including the cardholder's telephone number is stored in a table associated with the master account and card identifier, as shown in FIG. 8). The cardholder may be asked to confirm his identity (e.g., the individual answering the telephone may be asked to identify himself, and may he asked for the PIN associated with the card number), and is also asked to confirm that the transaction is legitimate. Additionally, the cardholder may he contacted via the operation of a short message service (SMS) module 718. For example, the SMS module 718 may send an SMS message to the cell phone of the cardholder (this number is stored in the database 706 in association with the card number), asking the cardholder to confirm that the proposed transaction should be approved. To allow the confirmed transaction to be approved, the cardholder must respond in the affirmative, and must also enter his PIN code. The SMS module 718 receives the response message, and returns it to the fraud check module 716. If the return message indicates that the proposed transaction is not to be approved, then the proposed transaction is declined (discussed later), and the card is frozen (also discussed later). If the return message indicates that the transaction is legitimate, and also contains the PIN associated with the card, execution flow is passed on to profile check module 720.

The profile check module 720 operates upon child cards. A "child" card is a card that is associated with the same master account (discussed with reference to FIG. 8) to which a parent card is associated. The effect of such association is that the parent and any number of associated child cards draw upon the same funds, i.e., draw upon the same line of credit, upon the same stored value, upon the same balance of pre-paid services or goods, and/or upon the same checking account or bank account. The cardholder associated with the parent card receives a statement presenting the transactions of all accounts associated with the master account, meaning that the cardholder of the parent card receives a statement presenting transactions executed via both the parent card and any child cards. The parent card may impose rules upon the spending permissions of the child card, as discussed in ore detail, below. For example, assume the circumstance in which a parent is a cardholder. The parent may create a child account for use by his son or daughter. The bill generated by the child account is rolled up into the bill on the parent's account. The parent may assign rules to the child's account. For example, the parent may associate a rule with the child account permitting the child account to incur up to a chosen level debt per a chosen unit of time (example: $250 per month). Other rules include, without limitation: (1) disallowing purchases of certain SKUs or classes of SKUs (example: disallow purchases of SKUs indicating that the purchased item is alcohol); (2) disallow purchases occurring at certain merchants, merchant types, and/or merchant categories; (3) allow only purchases occurring at certain merchants, merchant types, and/or merchant categories. To this end, according to some embodiments, the database 706 stores one or more tables that associate a merchant type and/or merchant category for the various merchant identifiers stored therein. The profile check module 720 operates by retrieving the rules (if any) associated with a card number, and testing the proposed transaction against rules. If any of the rules are violated, the cardholder of the parent card may be contacted, as described with reference to the fraud check module 716, to allow the transaction.

For example, the profile check module 720 may operate by accessing a table that associates card identifier of child card (s) with the parent card that controls it. The profile check module 720 may examine the table to determine whether the card identifier (retrieved initially by the third decryption unit 712) is presented therein as corresponding to a parent card. If it is not found therein, the card is not a child card, and no rules imposed by a parent card are associated therewith. Alternatively, if it is found therein, it is a child card, and may have rules associated with it. In such a circumstance, the aforementioned table may associate the child card with a value that may be used as a key to yet another table that associates the aforementioned value with a pointer that points to executable code implementing the rules chosen for the card. The executable code is then executed to determine if any of the rules are violated, as described above.

If either the balance check module 714, the fraud check module 716, or the profile check module 720 indicates that the transaction should not be allowed, then control passes to the decline/freeze module 722. The decline/freeze module 722 declines the transaction, and sends a message to the point-of-sale device indicating that the proposed transaction has been declined (details regarding the structure of such a return message to the point-of-sale device are presented below). Additionally, if the fraud check module 716 indicates that the purchase is fraudulent, then the account associated with the card is frozen, meaning that no future transactions will be permitted, until the card is reactivated.

If each of the balance check module 714, the fraud check module 716, and the profile check module indicates that the transaction should he allowed, then control passes to the record transaction module 724. The record transaction module enters the data recovered by the three decryption modules 704, 710, and 712, including the level three data, into the database 706. For example, a transaction identifier—different from the one assigned by the merchant—is assigned to the transaction. A new record, identified by the newly assigned transaction identifier is created in a table that relates details relating to a transaction with the newly assigned transaction identifier. Thereafter, the various fields of the new record are populated using the data recovered by the three decryption modules 704, 710, and 712, including the level three data. (The merchant's transaction identifier is also stored in the aforementioned table in association with the newly-assigned transaction identifier, thereby preserving the association between the transaction platform's transaction identifier and the merchant's transaction identifier.)

Figure 9:
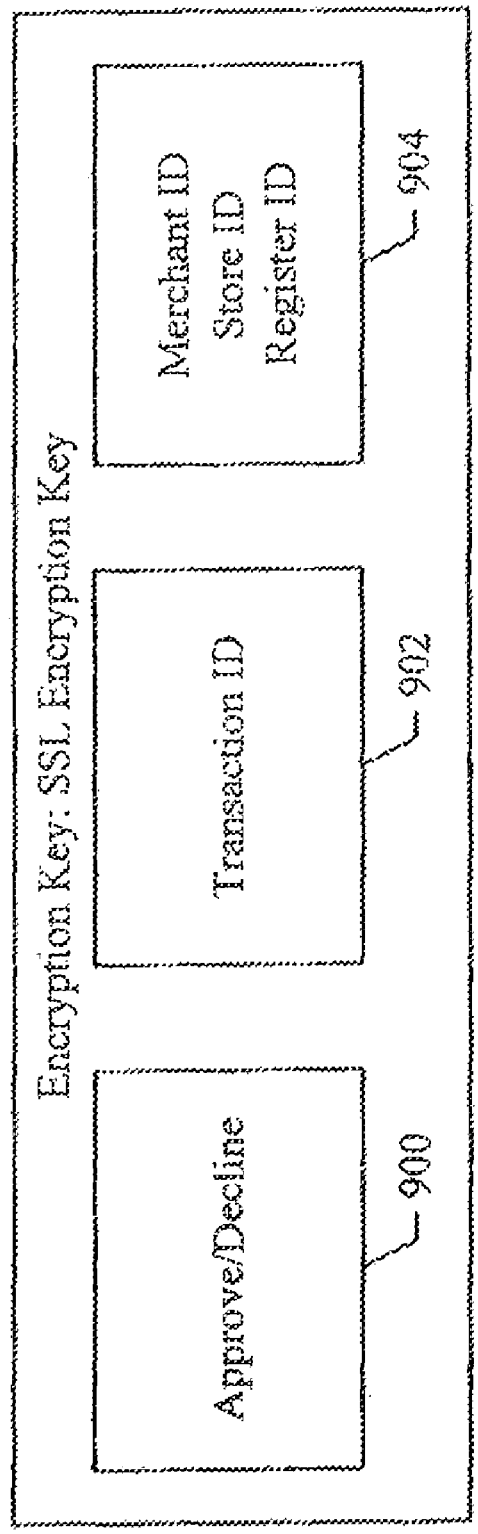
FIG. 9 depicts an exemplary embodiment of a message communicated from the software system of FIG. 7 to the kernel of FIG. 5.

As mentioned previously, the point-of-sale device located at the merchant is notified of the decline/approval of the transaction. According to some embodiments, a message structured as shown in FIG. 9 is transmitted via the SSL module 702 and TCP/IP module 700 to the previously discussed kernel executing on the merchant's server 402. As can be seen from FIG. 9, the message includes an indication of whether the proposed transaction was approved or declined 900, the transaction identifier 902 assigned by the merchant's database, and the merchant identifier, store identifier, and register identifier 904.

The message of FIG. 9 is received by the TCP/IP module 528 of the kernel (FIG. 5), and is passed to the SSL module 526, whereupon it is decrypted. The payload thereof is transferred to the acknowledge module 530, which uses the API 504 to update the database 404 with the information concerning the approval or decline. (The indication 900 of whether the proposed transaction was approved or declined is associated with the merchant's transaction identifier 902, which is included within the message of FIG. 9). According to some embodiments, at the time the kernel is installed upon the merchant's server 402, the acknowledge module 530 is altered to include the appropriate table and field name for entry of such information (e.g., the code and/or data space of the acknowledge module 530 is altered to include the table name and field name of the appropriate location for entry of such information). Thereafter, the merchant identifier, store identifier, and register identifier 904 are used to determine how to route the information concerning the decline/approval to the appropriate point-of-sale device 202, and the transaction identifier is used to decline/approve the appropriate transaction.

As described in the foregoing discussion, according to some embodiments, the level three data that is the subject of a given transaction is collected, communicated to the software system of FIG. 7, and stored in the database 706, at a point in time that is contemporaneous with the execution of the transaction. This provides certain advantages that, while notable, are not essential to practice of the invention. For example, because the level three data is captured and entered into the database 706 during execution of the transaction (as opposed to after execution of the transaction), the software system may examine the level three data and compare such level three data against various rules, to determine if a proposed transaction should be approved or denied. As discussed below, a cardholder may select fraud detection rules that, for example, identify a proposed transaction as being potentially fraudulent if a particular good or class or categories of goods are the subject of the transaction. Clearly, such rules cannot be imposed if data concerning the identity of the goods that are the subject of the transaction is either absent or not gathered until after the transaction has been executed. As also discussed below, a cardholder may customize rules governing permissible spending from a "child card." For example a cardholder may specify that a child card is forbidden to execute a transaction in which a particular good or class of goods is a subject thereof. Again, such rules cannot be imposed if data concerning the identity of the goods that are the subject of a given transaction is either absent or not gathered until after the transaction has been executed. Finally, because the level three data is gathered and stored contemporaneously with the transaction, a cardholder may be presented with information concerning the identity of items purchased with any card associated with his or her card (including, for example, items purchased via a child card) and the identity of which card number conducted such transactions. Such information may be provided in real time or in near real time, such as via a web site or a call center.

According to some embodiments, the database 706 may be organized as shown in FIG. 8. As can be seen from FIG. 8, the database may be organized so as to associate a card number 800, i.e., a set of data that is encoded/stored/contained on a storage medium of a transaction card and that uniquely identifies that card, with a card identifier 802. A card identifier 802 is a set of data (e.g., an integer) that is uniquely associated with a card number 800 in the database 706. The card identifier, in turn, is associated with a master account number 804.

The master account number 804 is a set of data that is uniquely associated with all of the account information 806 of every account that may be accessed via the transaction card, and is also associated with all of the cardholder information 808 that may be accessed via the card. For example, the master account number is associated with the balance of every account that may be accessed via the card. Thus, it may be associated with a credit balance (as when the card is used as a credit card), a bank account balance (as when the card is used as a debit card), and/or a stored value balance (as when the card is used as a store value card, e.g., gift card, prepaid good and/or services card, etc.). The master account number 804 is also associated with all of the details, e.g., level three data, of all of the transactions executed through every account that may be accessed through the card. Further, the master account number 804 is associated with every rule governing the card, e.g., interest rules, late payment rules, fraud detection rules, child account spending rules, etc. Still further the master account number 804 is associated with information relating to the financial institution tied to each account that may be accessed through the card, e.g., the bank that extends the line of credit behind the card's use as a credit card, etc. In general, every unit of data required and/or associated with the card's capacity as a credit card, debit card, and/or stored value card is associated with the master account number, either directly or indirectly.

The aforementioned arrangement presents certain advantages that are noteworthy, but not essential to practice of the invention. For example, assuming that the transaction card associated with the card number 800 were to be stolen, another card, having another card number, such as card number 810 may be reassociated with the master account number (by way of a new card identifier 812). In so doing, all of the account information 806 and cardholder information 808 remains in place, and no such information is lost.

Another advantage inheres in the arrangement of FIG. 8, which is noteworthy but not essential to the practice of the invention. As shown in FIG. 8, more than one card number 800 and 810 may be associated with the same master account number 804. Consequently, a cardholder may elect to possess two transaction cards—one for personal use, and one for business use, for example. (Although this example describes two card numbers 800 and 810 associated with a particular master account number 804, any number of card numbers 800 and 810 may be associated with the same master account number 804.) Thus, a single statement or webpage may present an account breakdown 814 to the cardholder, showing, for example, total spending for each card, or even presenting, on a transaction-by-transaction basis all of the level three data (e.g., each item and cost associated therewith) for each card.

According to some embodiments, a transaction may be conducted without the use of a transaction card, and is conducted, rather, via wireless device, such as a cellular telephone and/or a personal digital assistant. For the sake of illustration only, the following exemplary embodiment is described with reference to a cellular telephone. As described previously, the transaction may be initiated at a point-of-sale device 202, where the bar codes associated with the items to be purchased are scanned by an attendant. At this point, the attendant asks the cardholder for his cellular telephone number (or otherwise acquires the cellular telephone number, e.g., has the cardholder call a specific number that captures the cardholder's cellular telephone number and communicates it to the point-of-sale device 202, the merchant server 402, or to a computer system in communication with either the point-of-sale device 202 and/or the merchant's server 402), and the telephone number is entered into the point-of-sale device 202.

Figure 10:
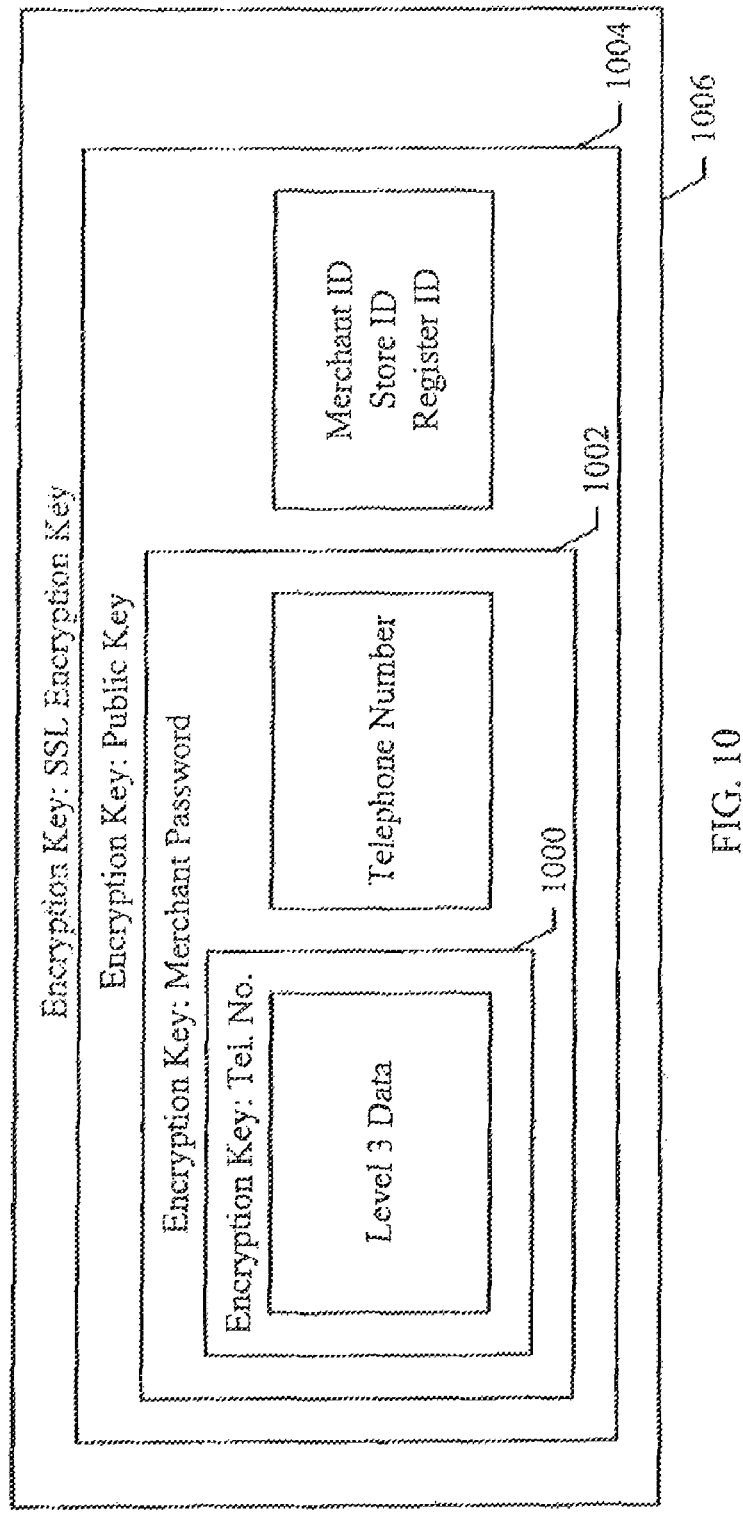
FIG. 10 depicts an exemplary embodiment of a message communicated from the kernel of FIG. 5 to the software system of FIG. 7.

The point-of-sale device 202 then enters the level three data into database 404, as described previously with reference to FIG. 5. Again, this causes the monitor module 512 to observe the creation of a new transaction identifier 508 in the transaction table 506, thereby propagating the set of events described previously, with the following exceptions. The first encryption module 520 is instructed to use the telephone number of the cardholder's cellular telephone to encrypt the level three data, yielding a first encrypted object 1000, as shown in FIG. 10. Then, the second encryption module 522 appends the cellular telephone number to the first encrypted object (in lieu of placing the card number there), and encrypts the appended data set with the merchant password, as described previously, yielding the second encrypted data set 1002. The remainder of the kernel functions as described previously.

At the transaction platform's server, much of the handling is similar to that described previously with reference to FIG. 7, with the following exceptions. When passed the first encrypted object and appended data, the third decryption unit 712 detects that a cellular telephone number had been inserted in place of the card number (for example, such a detection may be made virtue of the fact that a cellular telephone number and a transaction card number are different lengths). Upon detecting that a cellular telephone number has been inserted in place of the card number, the third decryption unit 712 uses the cellular telephone number as the decryption key to decrypt the first decrypted object. Thereafter, the third decryption unit 712 invokes the SMS module 728 with the cellular telephone number. The SMS module 728 sends an SMS message to the telephone number provided thereto. The SMS message indicates the total price of the transaction and the name of the merchant store at which the proposed transaction is to be conducted. The message prompts the user to either confirm or deny the transaction. If the user confirms the transaction, he enters his PIN into the telephone, and an applet and/or other form of executable code bundles the PIN with the user's card number (the applet and/or other form of executable code is previously altered to include the card number in its code or data space), generating a response that indicates that the proposed transaction is to he confirmed, and including therewith the user's card number and the PIN associated therewith. According to sonic embodiments, the reply message confirming or denying the transaction is communicated via a wireless Internet connection established by the device and is encrypted via the SSL protocol. The reply message is returned to the third decryption unit 712. If the reply message denies the transaction, then the transaction is declined, as described previously with reference to FIG. 7. On the other hand, if the reply message approves the transaction, then the third decryption module 712 accesses the database 706 to retrieve the user's PIN, based upon the card number, as described previously. If the retrieved PIN matches the PIN entered into the cellular telephone and passed to the third decryption module 712 via the SMS module 728, then the process continues as described previously with reference to FIG. 7 (i.e., the balance check, fraud check, and profile check are performed, as usual).

The effect of the foregoing is that a cardholder may transact a purchase by simply providing his cellular telephone number to an attendant at a point-of-sale device 202. After the item(s) to be purchased have been scanned in by the attendant, the cardholder receives an SMS, asking the cardholder to confirm the correctness of the total price. The cardholder confirms by responding to the SMS in the affirmative and entering in his PIN.

According to some embodiments, a cardholder may utilize a wireless device, such as a cellular telephone, to transact a purchase of a good or service from a vendor that does not have a wired point-of-sale arranged to interact with the kernel of FIG. 5. The wireless is programmed with an applet to permit entry of a total monetary sum of the transaction, a merchant identifier, and the PIN number associated with the cardholder's transaction card. According to some embodiments, the applet is configured at installation to have access to the cardholder's card number. The applet then combines the card number, merchant identifier, total amount of the transaction, and a transaction type data unit describing the type of transaction into a packet that is first encrypted using the PIN as an encryption key, and then is encrypted using SSL. At the software system of FIG. 7, the packet is decrypted, first by the SSL module 702, and then by the third decryption module 712. Thereafter, the process proceeds as previously described.

As mentioned previously, the kernel of FIG. 5 and software system of FIG. 7 may cooperate to execute various sorts of transactions, and may accomplish such variety of transactions by varying the data carried in the encrypted transport object of FIG. 6. For example, the aforementioned infrastructure may cooperate to perform a "private club purchase." A private club purchase is a purchase conducted at a merchant that requires a membership (e.g., Sam's Club, a movie rental store, etc.). For example, consider the scenario in which an individual wishes to rent a movie from a movie rental store. Such a store typically requires presentation of a membership card, in order to conduct a purchase. The membership card typically bears a storage medium (bar code, magnetic strip, etc.) encoding a number associated with a membership account. Such a membership card is obsolete in view of the infrastructure herein.

As an initial step, a cardholder may associate his membership account number (or other identifying number associated therewith, such as the number encoded on the storage medium of his membership card) with his master account. When, renting his movie, the cardholder presents a transaction card of the sort disclosed herein to both purchase the movie rental, and to present his membership account. The employee may "swipe" the card as described previously, setting in motion the events previously described. However, in this context, the transaction type data is set to a value to indicate that a private club purchase is being carried out. (The level three data carries data describing the title of the movie being rented, etc.). Thus, an encrypted transport object having a merchant identifier identifying the movie rental merchant, a store identifier identifying the particular store, a point-of-sale identifier identifying the particular point-of-sale device, the card number of the transaction card, the level three data as just described, and the transaction type data as just described is communicated to the software system of FIG. 7.

Upon receiving the encrypted transport object carrying the system behaves as previously described, with the following exception: the system accesses a table in the database 706 that relates the private club's membership number for other number associated therewith) with the master account and card identifier. The system acquires the aforementioned membership number and returns that number in the response packet of FIG. 9, in addition to the elements shown therein. Hence, the point-of-sale device is provided with approve/decline information regarding the financial transaction, and is also provided with the membership number of the cardholder. Thus, the need to complete a private club transaction with two cards is eliminated.

The aforementioned infrastructure may also be used to conduct a data acquisition transaction. A data acquisition transaction is a transaction in which the card is used to obtain information associated with the card's identifier and with the master account. Such retrieved information could be simple. For example, the retrieved information could present an indication of whether an individual is indeed a member of an organization (e.g., whether an individual is a member of a health club). Alternatively, the information could be complex, such as indicating health information of the cardholder. In the context of a data acquisition transaction, the infrastructure behaves as previously described, with the following exceptions, which are described with reference to a cardholder using his card to provide healthcare to a healthcare institution (hospital, clinic, etc.).

As an initial matter, the cardholder establishes a set of rules within the database 706 that identify which sort of data can be retrieved. For example, the rules describe the sort of health care data that can be retrieved from the card by various institutions identified by their respective merchant identifiers.

At the health care facility, the card is "swiped" to read the storage medium thereon, and the series of events previously described occur. However, in this context, the cardholder may not be conscious, so the PIN to be entered may be "911," or some other pre-defined PIN. The transaction type data is set to a value to indicate that a data acquisition transaction is being carried out. (The level three data may be null or may be filled with dummy data, as may be the store identifier and the point-of-sale identifier, however, in some instances these fields are populated so that a response message can be routed to the proper transaction execution device within the health care facility). Thus, an encrypted transport object having a merchant identifier identifying the health care facility, the card number, and the transaction type data as just described is communicated to the software system of FIG. 7. (Again, in certain instances, the store identifier and point-of-sale identifier may be populated.)

Upon receiving the encrypted transport object, the system behaves as previously described, with the following exceptions. Upon identifying that the merchant identifier corresponds to a health care facility and that the transaction type data corresponds to a data acquisition transaction, the third decryption module is bypassed, as the level three data is null. Then, the software system accesses the database 706 to obtain the rules governing access to the data associated with the merchant identifier. For example, the database 706 may contain a table relating each merchant identifier, master account, and card identifier with the cardholder data that may be returned thereto in response to a data acquisition transaction. The software system then implements the rules, returning the data permitted to be returned to the healthcare facility, given the rules. Thus, the transaction card described herein may be used to provide any variety of information to any variety of organization.

To permit the foregoing transactions, the front end module of FIG. 7 may provide a web site into which a cardholder may login. The web site may present one or more web pages structured to permit the cardholder to associate any data with his card, including health care data, insurance data, club membership data, or any other data, including user-specified data. The web site may also present one or more web pages structure to permit the cardholder to associated rules governing access to such data, for example, on a merchant-by-merchant (entity-by-entity) basis.

Some features of the system described with respect to FIGS. 2-10 are of note, but not essential to practice of the invention. As can be seen from FIG. 2, for example, the transaction system does not include any interchange actors and therefore eliminates system components and financial charges related thereto. For example, as compared to the system of FIG. 1, it can be seen that the system of FIG. 2 requires no private network lines or elements. Thus, the interchange actors responsible for the creation and maintenance of such network lines and elements are eliminated from the process of execution of a transaction. Therefore, the costs ordinarily borne by merchants for the provision of their interchange services are eliminated. However, according to some embodiments, a minimal number of network line and/or elements may be utilized.

The database maintained by the transaction platform includes tables having fields for the inclusion of credit limits, fraud rules, and other rules ordinarily imposed on a bank-by-bank or association-by-association basis. The software system of FIG. 7 includes a front end 726 that permits access to the database by cardholders and card-issuing banks. A card-issuing bank may establish rules, e.g., credit limit rules, fraud detection rules, etc. associated with a given card number via the front end module 726. The rules established by the card-issuing bank are housed in the database 706, in association with the card number to which the rules apply. Therefore, the transaction platform's server does not need to communicate with the card-issuing banks information systems with each proposed transaction in order to deny or approve the transaction. Instead, the transaction platform's server may periodically update the card-issuing bank's information system (e.g., on a daily basis), after having independently approved one or more transactions during the period.

Also of note, but not essential to practice of the invention, is that the database 706 may contain a table that relates the card identifier to a bank identifier. The bank identifier indicates the identity of the financial institution corresponding to a given card. By simply changing the bank identifier in the aforementioned table, the bank associated with a given card is altered. Thus, a cardholder may effectively transfer his balance from one bank to another, without having to change credit cards (the transaction platform simply changes the bank identifier).

Similarly, the database 706 may include a table that associates a card type identifier with a card identifier. The card type identifier identifies the sort of financial transaction(s) that is/are supported by the card. In other words, the card type identifier indicates whether the card is a credit card, debit card, stored value card, health care management card, other form of card, or a combination of some or all of the foregoing. Thus, a single transaction card may be used as a credit card in one context and a debit card in another context, for example. Stated another way, the database schema presents a mechanism by which a card number stored on a storage medium of a card and entered in the database 706 relates to a card identifiers the card identifier relates, in turn, to a card type identifier that identifies the kind of transaction to be supported by the card or information to be accessed through the card; the card type identifier and card identifier cooperate to relate to a set of tables organized and populated to permit the card to act as a credit card, debit card, stored value card, health information card, etc.

For example, as noted previously, the database includes a set of tables containing information sufficient to permit the card to act as a credit card. These tables include, amongst other information, information concerning the credit limit of the card, the interest rules related to the card, the late fee rules related to the card, the identity of the card-issuing bank related to the card, address information permitting contact with the information systems of the card-issuing bank (e.g., IP address, port information, physical address, etc.), and information of the like. The data in these tables can be associated with a given card by use of a card identifier, i.e., the card identifier may be used as a key in these tables.

A second set of tables permit the card to act as a debit card. These tables include, amongst other information, information concerning the checking account number and routing number of the account associated with the card, the balance of the checking account, and information of the like. Again, the data in these tables can be associated with a given card by use of a card identifier, i.e., the card identifier may be used as a key in these tables.

A third set of tables permit the card to act as a stored value card. A stored value card is a card that provides access to a pre-paid good or service (e.g., a pre-paid telephone calling card, a gift card, etc.). These tables include, amongst other information, information concerning the balance available, the merchant store(s) at which the balance may be spent, rules regarding any restrictions upon spending of the balance, and other information of the like. Again, the data in these tables can be associated with a given card by use of a card identifier, i.e., the card identifier may be used as a key in these tables.

Yet another set of tables permit the card to act as a health record access card. A health record access card is a card that permits access to health information stored in a database, such as the database 706 of FIG. 7. These tables include, amongst other information, information concerning health insurance held by the cardholder, dental insurance held by the cardholder, vital statistics of the cardholder, medications taken by the cardholder, allergies of the cardholder, surgical procedures undergone by the cardholder, information concerning the physician and other health care providers of the cardholder, personal health record, electronic medical record, payment adjudication, copayment calculation and settlement, and other information of the like. Again, the data in these tables can be associated with a given card by use of a card identifier, i.e., the card identifier may be used as a key in these tables.

Figure 11:
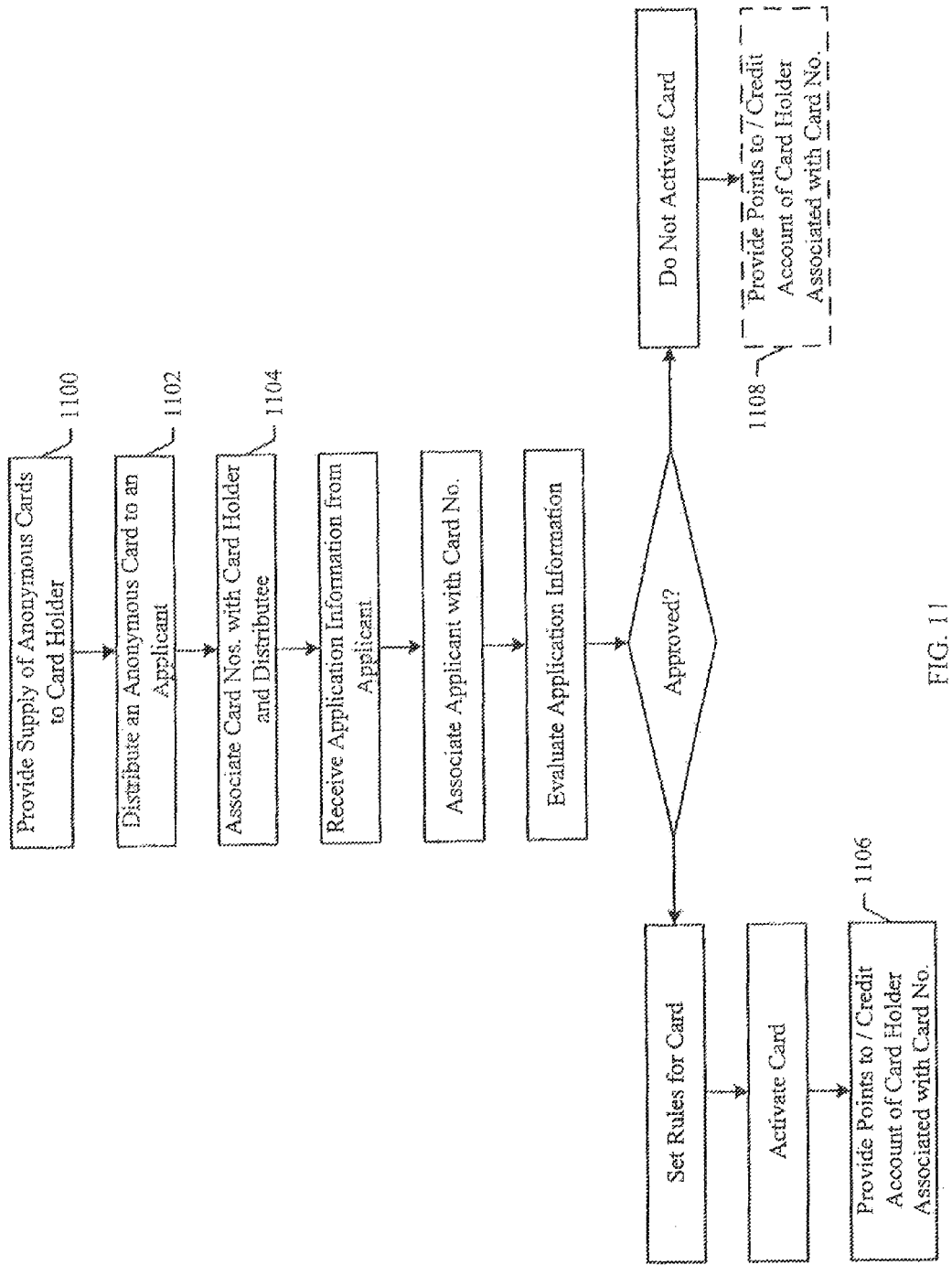
FIG. 11 depicts an exemplary embodiment of a method for rewarding a cardholder for distributing anonymous, unassigned cards to prospective applicants.

As discussed with respect to FIG. 3, a scheme for rapid placement of an activated transaction card in the possession of an applicant was previously described. FIG. 11 presents a method by which current cardholders may distribute transaction cards on behalf of the transaction platform, and may receive an incentive for so doing. A cardholder wishing to act as a distributor of transaction cards may request a supply of anonymous, unassigned transactions. In response, the transaction platform provides the cardholder with such a supply of unassigned, anonymous cards (operation 1100). The cardholder distributes one of the anonymous cards to a person that he has reason to believe would like to be a cardholder (e.g., a friend, coworker, etc., as shown in operation 1102. Either prior to such distribution or thereafter, the distributed card is associated with the cardholder in the database 706 (operation 1104). For example, a table may be populated to associate the card numbers of each of the distributed anonymous cards and the card identifier corresponding to the cardholder to whom the cards were delivered. The table may also be populated to include information identifying the person to whom the cardholder distributed the unassigned transaction card (i.e., the prospective applicant), Operation 1104 may he conducted, for example, by the cardholder, at a web site presented by the front-end module 726.

After operation 1104, the procedure for application proceeds as described with reference to FIG. 3. However, as shown in operation 1106, in the event that the person to whom the cardholder supplied an anonymous card is approved, incentive points are added to the distributing cardholder's account, assuming that the applicant's identification information matches the identification information supplied by the cardholder in operation 1104 (this prevents a cardholder from requesting a large number of unassigned transaction cards and leaving a stack of them, for example, in a shopping center in hopes of being credited for any applications resulting therefrom). Also, in addition to, or as an alternative to incentive points, the cardholder's account may be credited with a monetary sum. The association operation performed in operation 1102 permits the transaction platform's server to identify the proper card to which to add incentive points. Upon approval of an applicant's card, the transaction platform's software system may examine a table that relates the unassigned card numbers to the card identifiers of cardholders that received and distributed the cards, in order to determine if the card number of the just-approved card is associated with the card identifier of such a cardholder, if it associated, then the corresponding card identifier is obtained. Next, a table associating the card identifier with a master account may be accessed to obtain the master account of the cardholder that distributed the card. Thereafter, a table relating an incentive point balance to the master account number is accessed, and the incentive point balance is updated to reflect the added incentive points.

According to some embodiments, the distributing cardholder's account is supplied with points, even should the person to whom the cardholder supplied the card be rejected (operation 1108). According to some embodiments, the incentive points are spendable on items designated for such usage by merchants, or as may be used in the context of a generic rewards program. If a monetary sum is awarded to the cardholder's account, then the monetary sum may he spent on any good or service.

As discussed with reference to FIG. 6, some embodiments of the transaction system allow for communication of level three data describing a given transaction. For example, assuming that a cardholder transacted a purchase of soap, soda, and paper towels for a total of $15, the information communicated from the kernel of FIG. 5 to the software system of FIG. 7 includes information identifying the transaction as including soap at a cost of $8, soda at a cost of $4, and paper towels at a cost of $3, for a total of $15. The software system of FIG. 7 receives the information and, as described previously, creates a transaction identifier, identifying the $15 transaction. Each purchased item (and cost associated therewith) is associated with the transaction identifier. Thus, according to such embodiments, the database 706 contains data associating a particular merchant, merchant store, register, each purchased item, the cost of each purchased item, and the total cost of the transaction. The preservation of such level three data permits certain heretofore impossible functionality.

One example of functionality allowed by the preservation of level three data relates to enhanced resolutions of disputes. Presently, if a holder of a credit card reviews his or her statement and believes a particular charge is too great, the cardholder may dispute the charge. Continuing with the preceding example, assuming that the statement received by the cardholder presented that transaction as totaling $25, instead of $15, the cardholder would contact his credit card company, and state that the transaction should total $15, not $25. Consequently, the entire $25 transaction would be identified as being disputed, despite the fact that only $10 of the $25 is at issue, i.e., the cardholder acknowledges that he owes $15, but does not believe that he owes $25. The entire transaction must be disputed, in some instances, because a traditional credit card company does not receive detailed information concerning the contents of a transaction, and in other instances because the software systems employed by traditional credit card companies does not allow for dispute of a cost associated with a particular item. In response to the dispute, the cardissuing bank removes the $25 transaction from the cardholder's balance (until the dispute is resolved), and does not transfer any funds to the merchant's bank for the transaction—not even the $15 that the cardholder acknowledges that he indeed owes. Thus, the merchant fails to receive the $15 that both parties acknowledge the merchant is owed, until the $10 disputed amount is resolved.

Figure 12:
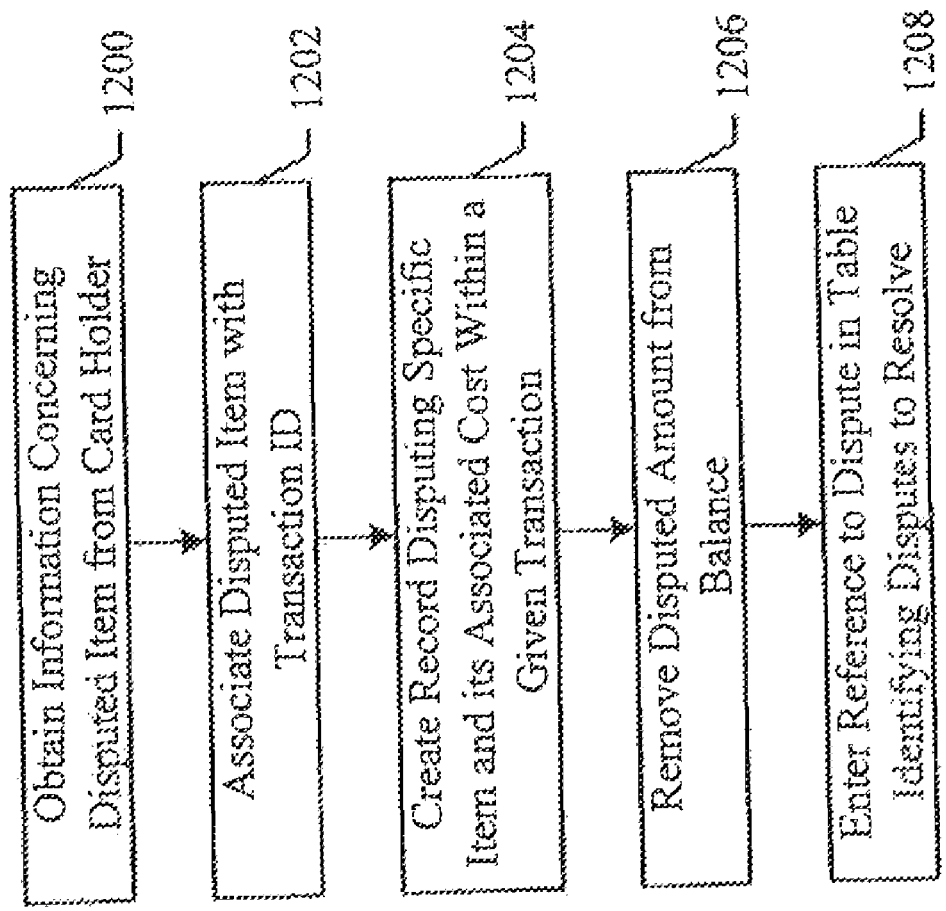
FIG. 12 depicts an exemplary embodiment of a method for permitting dispute of a cost associated with an item within a transaction.

According to the method of FIG. 12, disputes may be recorded on an item-by-item basis, as opposed to merely on a transaction-by-transaction basis. As shown in FIG. 12, information concerning the disputed item may be obtained from the cardholder (operation 1200). For example, a cardholder may call an employee of the transaction platform and describe the item disputed. For instance, the cardholder may describe the date, merchant, and disputed item. In general, the cardholder may recite any amount of the level three data to uniquely identify the disputed item. The employee accesses the database using the provided level information, until the specific transaction and disputed item thereof is identified. (The process of identifying the particular cost associated with a particular item that is the subject of a transaction may be performed via a web site presented by the front end module 726. For example, after logging in, a cardholder may select an option to dispute an item within a transaction. The web site may then present a series of fields, allowing the cardholder to identify the particular item to be disputed. For example, the web site may present a first field permitting the cardholder to view all transactions within a particular period of time, e.g., occurring on a given day. In response, the user may be presented a set of transaction summaries, e.g., a list of transactions identified by date, merchant, and total amount. Selection of a particular summary causes a list of each item that is a subject of the transaction, and cost associated therewith, to he presented. To dispute a particular cost, the cardholder may select the item to dispute, and may enter an explanation of the dispute in a field associated therewith.) Returning to the example whereby the dispute is entered via a telephone conversation with an employee, the transaction identifier of the transaction of which the disputed item is a constituent is found (operation 1202). Next, a record is created within one or more tables, in order to dispute the cost associated with an identified item of the identified transaction (operation 1204). For example, the record may dispute the cost associated with an item because the statement reflects a purchase price of an item at a cost different than the cardholder believes to be the true cost. Also, the record may dispute the cost associated with an item, because the cardholder denies having purchased the item at all. The record describing the dispute may include data fields for description of the disputed item, and the cardholder's reasons for disputing the cost associated with a given item. The cost associated with the disputed item is removed from the balance associated with the card (operation 1206), until such time as the dispute is resolved. Upon resolution of the dispute (beyond the scope of this disclosure, but understood by those of ordinary skill in the art), an appropriate monetary sum may be added back to the balance associated with the card. Finally, as shown in operation 1208, a reference to the record created in operation 1204 may be entered into a table of disputes to be resolved.

Another function that results from the collection of level three data is the resolution of billing statements that may he achieved. According to some embodiments, some or all of the level three data may be included on billing statements. According to some embodiments, a cardholder may select the amount of level three data presented on the statement associated with his card. For example, the front end 726 (FIG. 7) may present a web site that permits a cardholder to select the level of detail to be presented on his statement. The web site may allow, for example, the cardholder to indicate that all available level three data be presented. In this case, the statement presents all level three data collected for each transaction presented in the statement. The web site may also allow the user to select only certain types of level three data to be presented, e.g., only description of goods/services, or classification of goods/services, or SKU's of goods/services, etc. Thus, a statement may present, for each transaction, a description of each of the goods/services constituting each transaction, a classification of each good/service constituting each transaction, the SKU of each good/service constituting each transaction, etc. Of course, the web site may also permit the user to elect to have no level three data presented on his statement, in which case the statement presents typical transaction information (merchant, date, total amount of transaction).

Figure 13:
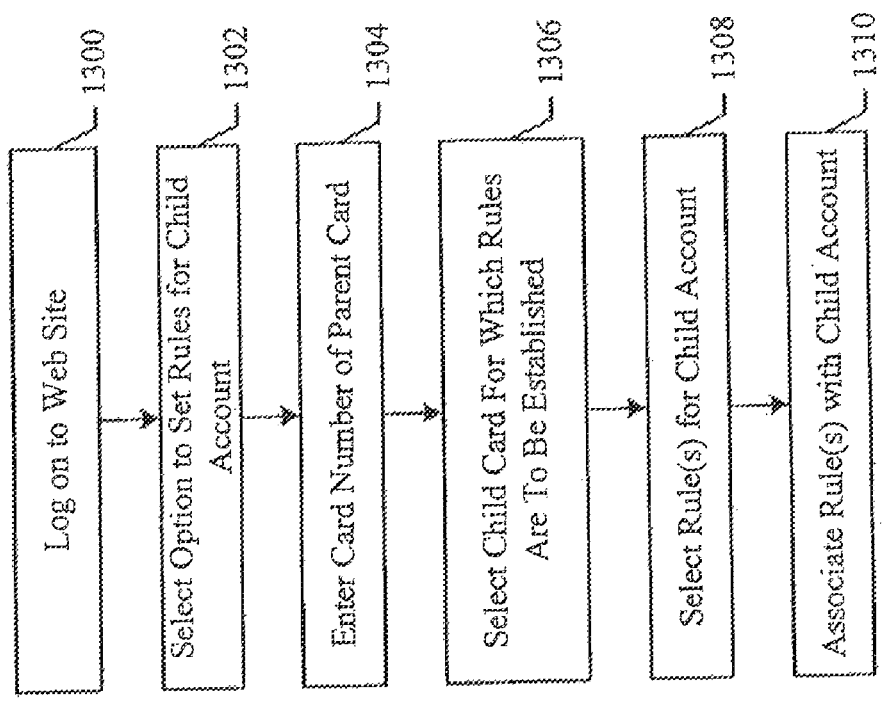
FIG. 13 depicts an exemplary embodiment of a method for establishing or changing rules governing use of a child card.

FIG. 13 depicts a method for establishing one or more rules governing a child card. As mentioned previously, a child card corresponds to an account that is a sub-account of a parent card. A cardholder of a parent card may establish one or more rules for a child card, for example, by logging on to a web site presented by the front end module 726 of the software system of FIG. 7 (operation 1300). For example, according to some embodiments, the web site presents a field for entry of the card number of the cardholder logging into the web site. The web site also presents a field for entry of a password and/or PIN corresponding to the card number. The cardholder enters his card number, password and/or PIN to log in. The software system of FIG. 7 thereby identifies the particular user of the web site as corresponding to a particular card number. Alternatively, the web site may present a field for entry of a user name associated with the cardholder (and therefore associated with his card number, etc.) and another field for entry of a password. The login procedure is executed upon entry of data in these fields.

Upon logging in, the cardholder is presented with a menu of options pertaining to his account. For example, the cardholder may be presented with a menu permitting the cardholder to review a real-time presentation of his statement, including his balance, review recent transactions related to any account that is, in turn, related to his card number, review and/or enter information, such as medical information, insurance information, etc. related to his card number, set personalized fraud rules to govern his card number, set rules to automatically alter his PIN from time to time, and/or to set rules governing a child account corresponding to his parent account. As shown in operation 1302, the cardholder selects an option to set rules governing a child account. In response to such a selection, as shown in operation 1304, the web site presents a list of child card numbers corresponding to the parent card number entered in operation 1300. For example, the software system of FIG. 7 examines a particular table in the database 706 that associates, either directly or indirectly, child card numbers with parent card numbers. All of the child card number associated with the parent card number entered during operation 1300 are identified and presented. According to some embodiments, the name of the cardholder associated with the child card is presented, as well. The parent cardholder then selects a card number from the list (operation 1306).

Thereafter, the web site present fields for customization of rules that may be applied to the child card. For example, the web site may present fields allowing the parent to associate a rule with the child account permitting the child account to incur up to a chosen level debt per a chosen unit of time (example: $250 per month). Other rules include, without limitation: (1) disallowing purchases of certain SKUs or classes or categories of SKUs (example: disallow purchases of SKUs indicating that the purchased item is alcohol); (2) disallow purchases occurring at certain merchants, types of merchants, and/or categories of merchant; and/or (3) allow only purchases occurring at certain merchants. The cardholder selects the rule for application to the child card, and enters the pertinent rule data (e.g., if the cardholder wishes to limit the child card to a limit of $250 per month, then "250" is entered in a spending limit field, and "month" is entered in a unit of time field, e.g., may he selected from a frequency pull-down menu) (operation 1310). Finally, as shown in operation 1312, the rules selected during operation 1310 are associated with the child card.

As mentioned with reference to FIG. 13, a cardholder may select fraud triggers to he assigned to his card and/or to a child card. As was the case with establishment of rules for a child card, fraud triggers may be established, for example, by logging on to a web site presented by the front end module 726 of the software system of FIG. 7 (operation 1400, FIG. 14). As just described, according to some embodiments, the web site presents a field for entry of the card number of the cardholder logging into the web site. The web site also presents a field for entry of a user name, password and/or PIN corresponding to the card number. The cardholder enters his card number, password and/or PIN to log in. The software system of FIG. 7 thereby identifies the particular user of the web site as corresponding to a particular card number.

As discussed with reference to FIG. 13, after logging in, the user selects an option to permit customization of fraud triggers. Thereafter, the web site responds by presenting the cardholder with various categorizations of fraud triggers that may be applied to the card (operation 1402). For example, as shown in box 1404, the web site may present the cardholder with a set of fields that that permit entry of data for designation of (1) a maximum number of dollars that may be spent per unit of time, with any expenditure over the limit being assumed to be fraudulent, e.g., any expenditure over $5000 in a day is assumed to be fraudulent; (2) a maximum purchase price for a single transaction, with any expenditure over the maximum purchase price being assumed to be fraudulent, e.g., any expenditure over $5000 is assumed to be fraudulent; (3) particular classes of products that are assumed to be fraudulent, e.g., a transaction including level three data having an SKU indicating that jewelry is attempting to be purchased is assumed to be fraudulent; (4) an increase in expenditures exceeding a given percent, e.g., the software system of FIG. 7 may track a given cardholder's expenditures over the last N days (N=30, 60, 90, etc.), and may calculate the median or average amount spent per day, with expenditures in a day exceeding the average and/or median expenditure by more than a selected percent being assumed to be fraudulent; (5) a class of merchants may be designated, e.g., any purchase at a jewelry store is assumed to be fraudulent; (6) particular merchants may be designated, e.g., any transaction having a merchant identifier corresponding to a selected merchant is assumed to be fraudulent; (7) particular goods or services may he designated, e.g., any transaction including level three data having an SKU corresponding to a selected good and/or service is assumed to be fraudulent; (8) geographic regions may be designated, e.g., any transaction having level three data indicating that the merchant store is located in a given region (state, country, continent, etc.) is assumed to be fraudulent.

The cardholder may enter data into any of the fields corresponding to the fraud rules he wishes to he applied to the card (operation 1406), Example: to establish that an expenditure exceeding $5000 should be considered fraudulent, the cardholder may enter "5000" into a field labeled "maximum allowable expenditure (in dollars)," Finally, as shown in operation 1408, the software system of FIG. 7 associates the selected rules with the card number entered during operation 1400.

As also mentioned with reference to FIG. 13, a cardholder may select a scheme by which a PIN associated with his card is modified. As described with reference to FIGS. 13 and 14, the cardholder may commence the selection of the PIN modification scheme by logging into the web site (operation 1500). The software system of FIG. 7 thereby identifies the particular user of the web site as corresponding to a particular card number.

Figure 14:
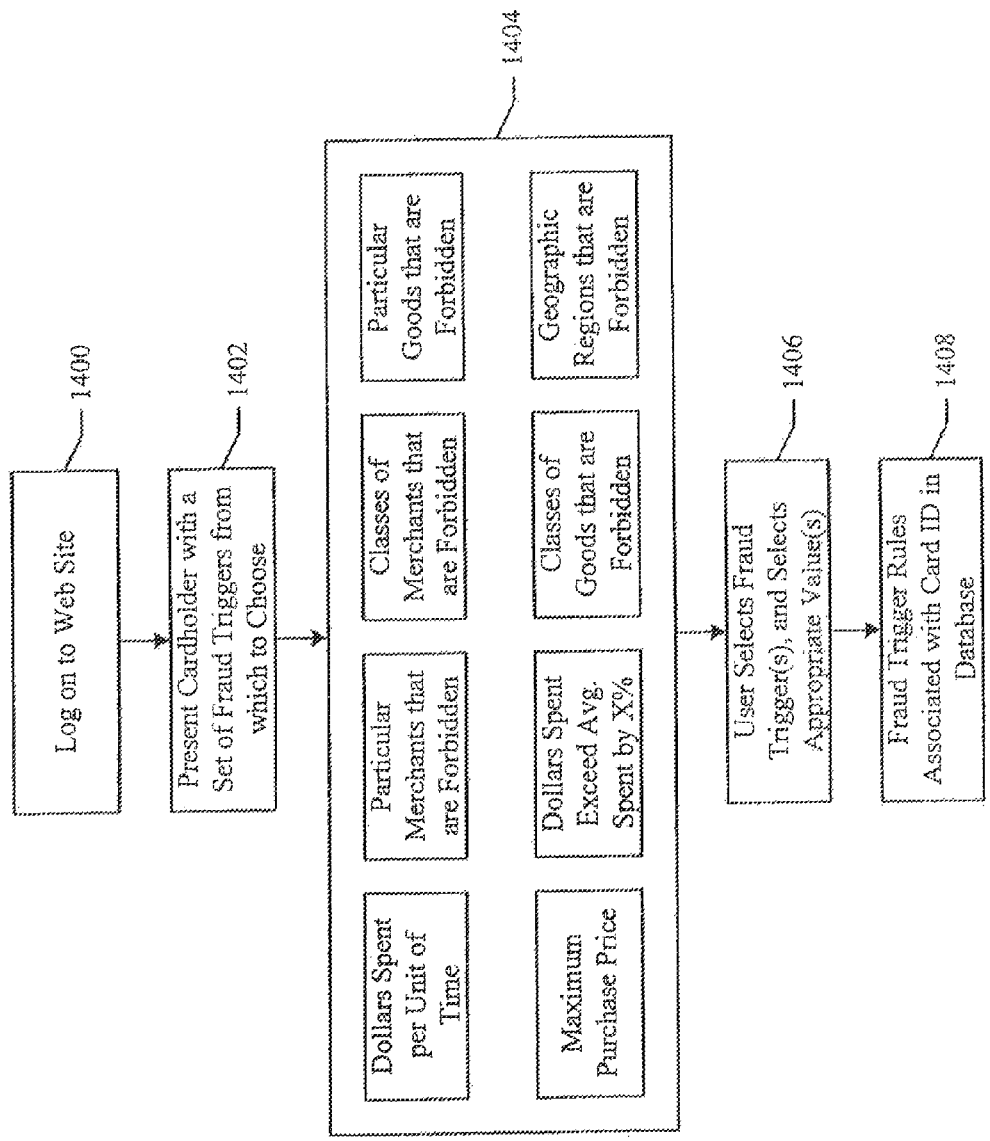
FIG. 14 depicts an exemplary embodiment of a method for establishing or changing user selectable fraud detection rules.
Figure 15:
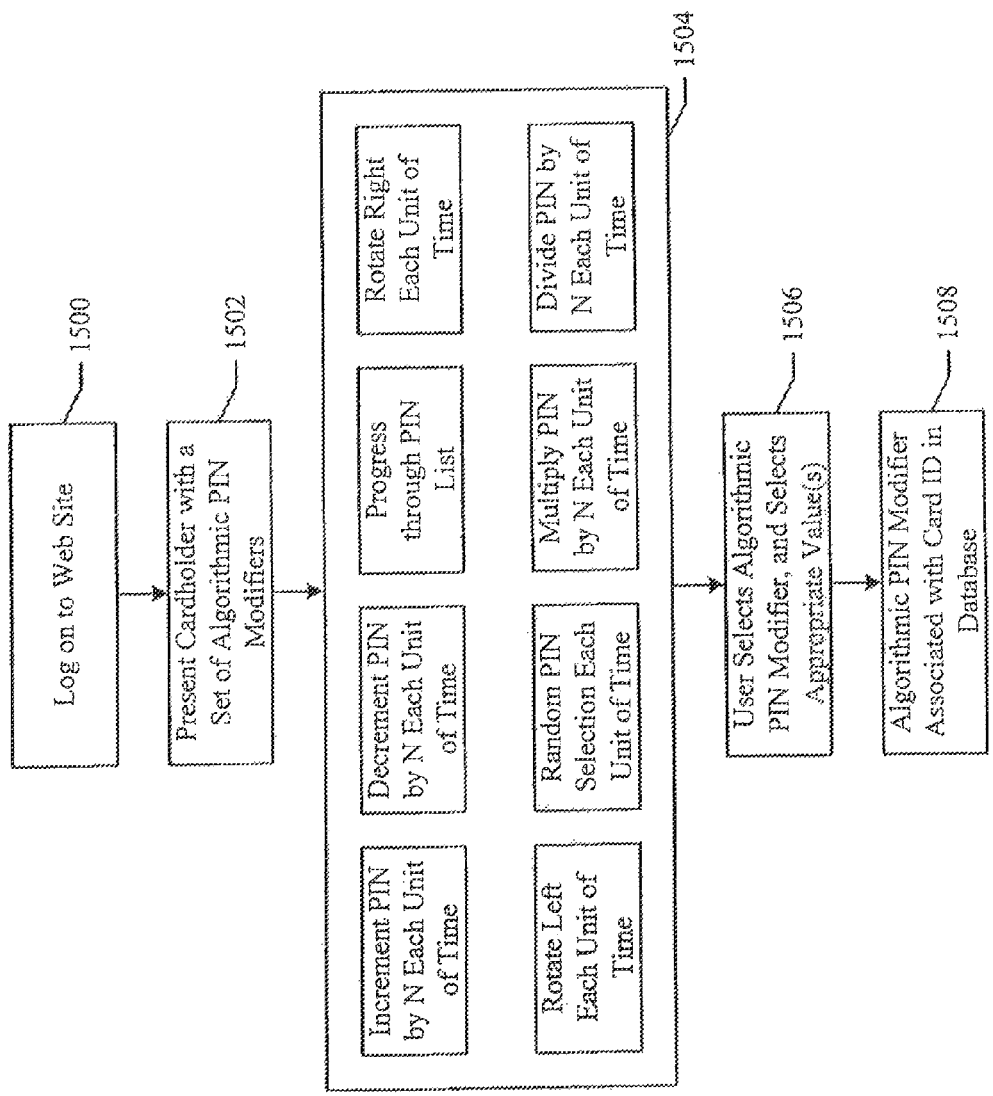
FIG. 15 depicts an exemplary embodiment of a method for establishing or changing user-selectable algorithmic PIN modification rules.

As discussed with reference to FIGS. 13 and 14, after logging in, the user selects an option to permit automatic modification of the PIN associated with his card. Thereafter, the web site responds by presenting the cardholder with various modification schemes that may be applied to the card (operation 1502). For example, as shown in box 1504, the web site may present the cardholder with a set of fields that permit entry of data for designation of (1) a selected quantity by which to increment the PIN per a selected unit of time, e.g., increment the PIN by a quantity of 5 each week; (2) a selected quantity by which to decrement the PIN per a selected unit of time, e.g., decrement the PIN by a quantity of 5 each week; (3) a selected set of PINs, each of which is active for a selected period of time, e.g., a selected set of 5 PINs, with the first PIN in the set being active for a week, the second PIN in the set being active for the next week, and so on; (4) the option to perform a rotate right operation on a PIN each unit of time, e.g., after one week PIN 4305 becomes 5430, after the next week it becomes 0543, and so on; (5) the option to perform a rotate left operation on a PIN each unit of time, e.g., after one week PIN 4305 becomes 3054, after the next week it becomes 0543, and so on; (6) a selection of a period of time for which a PIN is active, after the expiration of such time, a new PIN is randomly selected, e.g., randomly select a new PIN each week (the cardholder may log into the web site to learn of the new PIN, or may call a telephone number and learn of the new PIN number via interactive voice recognition, and/or have the PIN mailed to him, for example); (7) a selected quantity by which the PIN is multiplied with the passage of a selected period of time, e.g., multiply the PIN by 2 each day; (8) a selected quantity by which the PIN is divided with the passage of a selected period of time, e.g., divide the PIN by 2 each day; and/or (9) select a static portion of a PIN that is to be appended or prepended to a dynamic portion of a PIN that changes according to any algorithm, including the aforementioned algorithms, e.g., a static portion, 12345, to which a dynamic portion, 99, is appended yielding a PIN of 1234599, which may change to be 12345100, if the dynamic portion is selected to be altered by incrementing by one. Where a mathematical operation is performed upon the PIN, e.g., multiplying the PIN by a selected quantity, N, it is understood that the resulting quantity may be truncated, or otherwise operated upon, to arrive at a number of the appropriate number of digits. It should be noted, however, that, according to some embodiments, the PIN is not of a prescribed length, but may rather be on any length within a predetermined range, e.g., between four and fifty-six digits. Also, where a mathematical operation is performed upon the PIN, e.g., dividing the PIN by a selected quantity, N, it is understood that the resulting quantity may be rounded to a nearest number, or otherwise operated upon, to arrive at an integer quantity.

The cardholder may enter data into any of the fields corresponding to the PIN modification scheme he wishes to be applied to the card (operation 1506). Example: to establish that the PIN associated with his card should be incremented by 5 each week, the cardholder may enter "5" into a field labeled "quantity by which to increment PIN" and "weekly" in a field labeled "period in which to increment PIN." Finally, as shown in operation 1508, the software system of FIG. 7 associates the selected rules with the card number entered during operation 1500.

According to another embodiment, the software system of FIG. 7 may support selection of a PIN that is used only once. For example, the cardholder may select a PIN that is always associated with his card number (by use of a web site provided by the front end module 726, as described previously), in addition to thereto, the cardholder may select a PIN that may be used but once (again, by use of a web site provided by the front end module 726, as described previously). When, in the context of executing a transaction, the software system of FIG. 7 receives an encrypted transport object, such as the one of FIG. 6, the third decryption module 712 may initially attempt its decryption using the "ordinary" PIN, as described with reference to FIG. 7. Assuming that the decryption fails, the third decryption module 712 attempts decryption with the "one-time" PIN associated with the card number. If successful, the transaction is carried out as described previously, and the one-time PIN is disabled from further use. Such a one-time PIN is useful for settings in which the cardholder is hesitant about providing his "ordinary" PIN to a merchant, such as when the cardholder may be using an unfamiliar e-commerce website, or when he believes that entry of his PIN may be under observation. Since the PIN can only be used once, it does not matter if entry of the PIN is observed or captured by a website.

According to another embodiment of the invention, the aforementioned transaction scheme may be utilized to permit inter-merchant return of goods, as illustrated with reference to FIGS. 16A and 16B. For example, FIG. 16A depicts a typical on-line purchasing arrangement, whereby a cardholder 1600 orders an item from an on-line merchant 1602. The cardholder 1600 receives the item from the on-line merchant (operation 1601). In response, the card-issuing bank 1604 forwards the item price to the bank of the on-line merchant (operation 1603). Then, at the expiration of the billing period, the cardholder 1600 pays a sum of money equal to the item price to the bank 1604 (operation 1605).

Figure 16B:
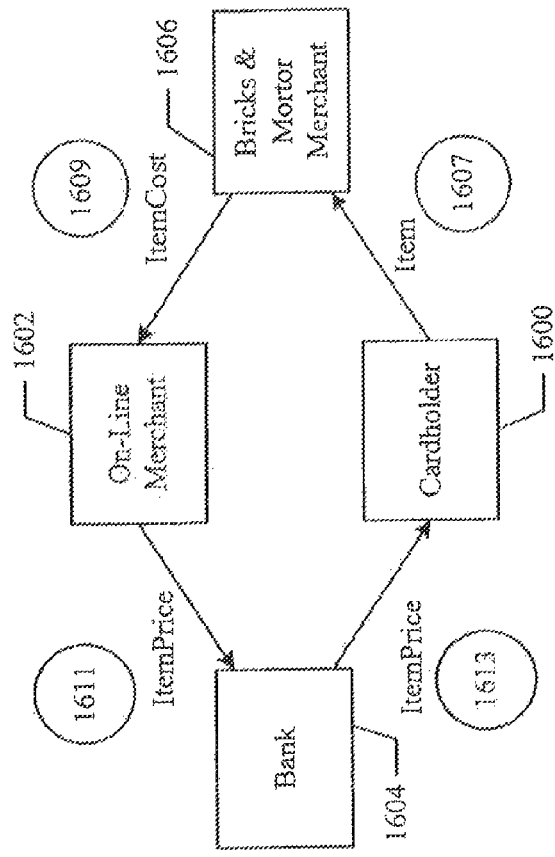
FIG. 16 depicts an exemplary embodiment of a scheme for permitting inter-merchant exchange of goods.
Figure 16A:
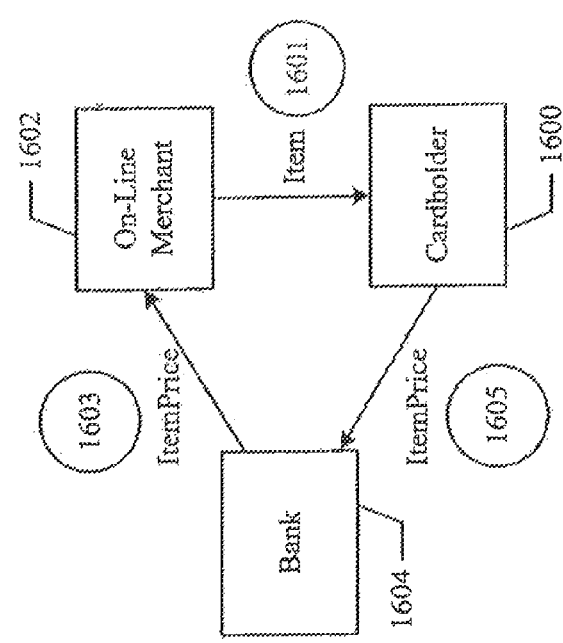

FIG. 16B presents one example of an inter-merchant return of goods arrangement, Per the arrangement of FIG. 16B, the cardholder 1600 returns the item to a bricks-and-mortar merchant 1606 (operation 1607). At the time of return, the cardholder 1600 presents his receipt to the bricks-and-mortar merchant 1606, who uses the information thereon to indicate to the transaction platform that a return of a particular good from a particular merchant by a particular cardholder is to be transacted at a the bricks-and-mortar merchant store 1606. Using the aforementioned information, the transaction platform accesses a rules database to determine a sum of money to be transferred from the bricks-and-mortar merchant to the on-line merchant. The transaction platform's server then initiates a transfer of funds from the bricks-and-mortar merchant's bank to the on-line merchant's bank equal to the determined sum (operation 1609). The aforementioned rule-based sum may be agreed upon in advance by the individual merchants, and may be a function of the particular good to be exchanged, or class of goods to be exchanged, and may additionally be a function of the two particular merchants involved in the inter-merchant exchange.

Thereafter, the on-line merchant 1602 transfers a sum of money equal to the item's price to the card-issuing bank 1604 (operation 1611), and the card-issuing bank 1604 credits the cardholder's account with a sum of money equal to the price of the item (operation 1613). Thus, the cardholder 1600 is free to conduct a purchase with one merchant (such as on-line merchant 1602), and to return the good to a second merchant (such as bricks and mortar merchant 1606). This return arrangement is made possible, because an agreed upon sum to be transferred from one merchant to another merchant in the event of an exchange of a particular good or class of goods is stored at a database in communication with the transaction platform's server.

Figure 17:
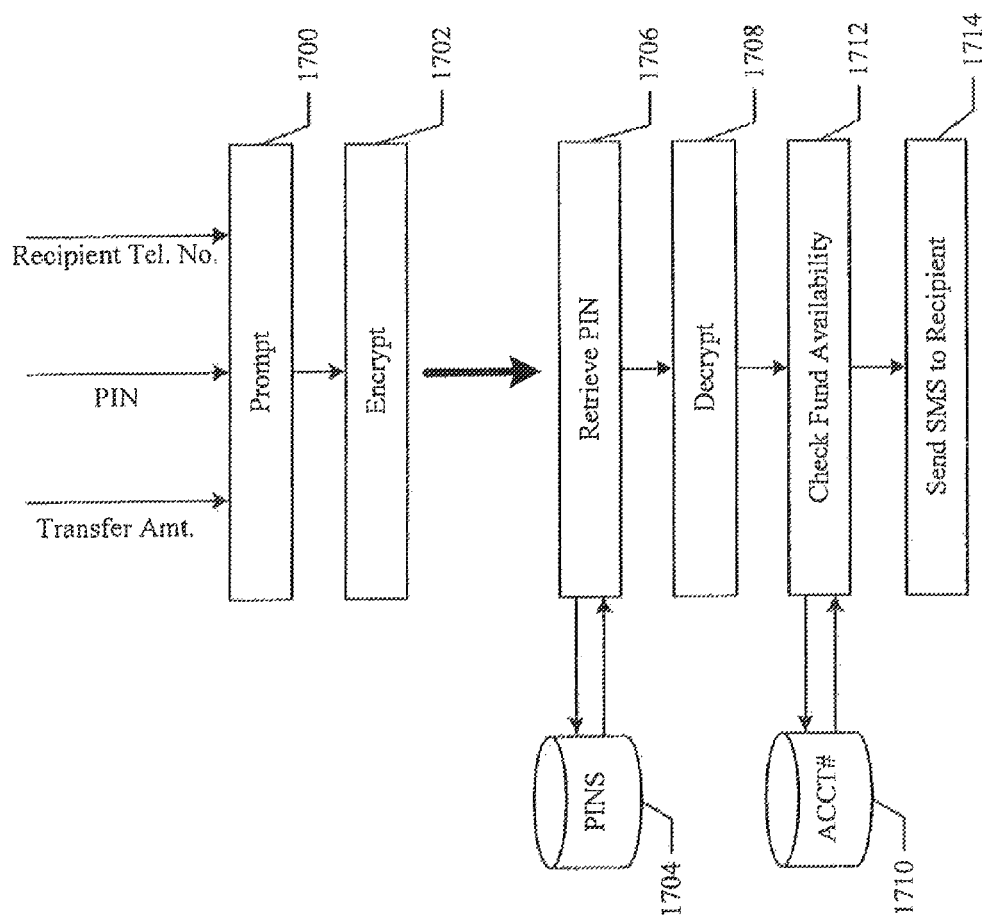
FIG. 17 depicts an exemplary embodiment of a person-to-person exchange of funds.

FIG. 17 depicts a scheme wireless exchange of finds between cardholders. The scheme involves an applet that runs on a processor within a cellular telephone. The applet includes a prompt module 1700 that asks a cardholder to enter the following data: (1) the quantity of money he or she wishes to transfer to another cardholder; (2) the cardholder's PIN code; and (3) the cellular telephone number of the recipient. The aforementioned data is agglomerated into a data set, and is encrypted by encryption unit 1702, which may operate according to the principles described above. The encrypted data set is then communicated via the SSL Internet connection transaction platform of FIG. 7.

At the front end, the telephone number from which the transaction originated is extracted, and is used to query a database 1704 that associated cardholder telephone numbers with PIN codes. The corresponding PIN code is therefore returned to module 1706, and is provided to decryption module 1708, which uses the PIN code as a decryption key.

Thereafter, the availability of funds in the account corresponding to the PIN is checked. According to one embodiment, the PIN or telephone number may be used to access a database 1710 that relates a card identification number to a PIN or telephone number. The retrieved card identification code is then sent to fund check module 1712, which determines whether the account corresponding with the PIN/telephone number has sufficient funds to permit the proposed exchange. If so, the exchange is transacted, and an SMS is sent by module 1714 to the recipient's telephone number, informing him or her of the exchange of funds.

A person-to-person exchange of funds may also be conducted on-line via a web site presented from the front end module 726, generally proceeding as described with reference to FIG. 17.

Figure 18:
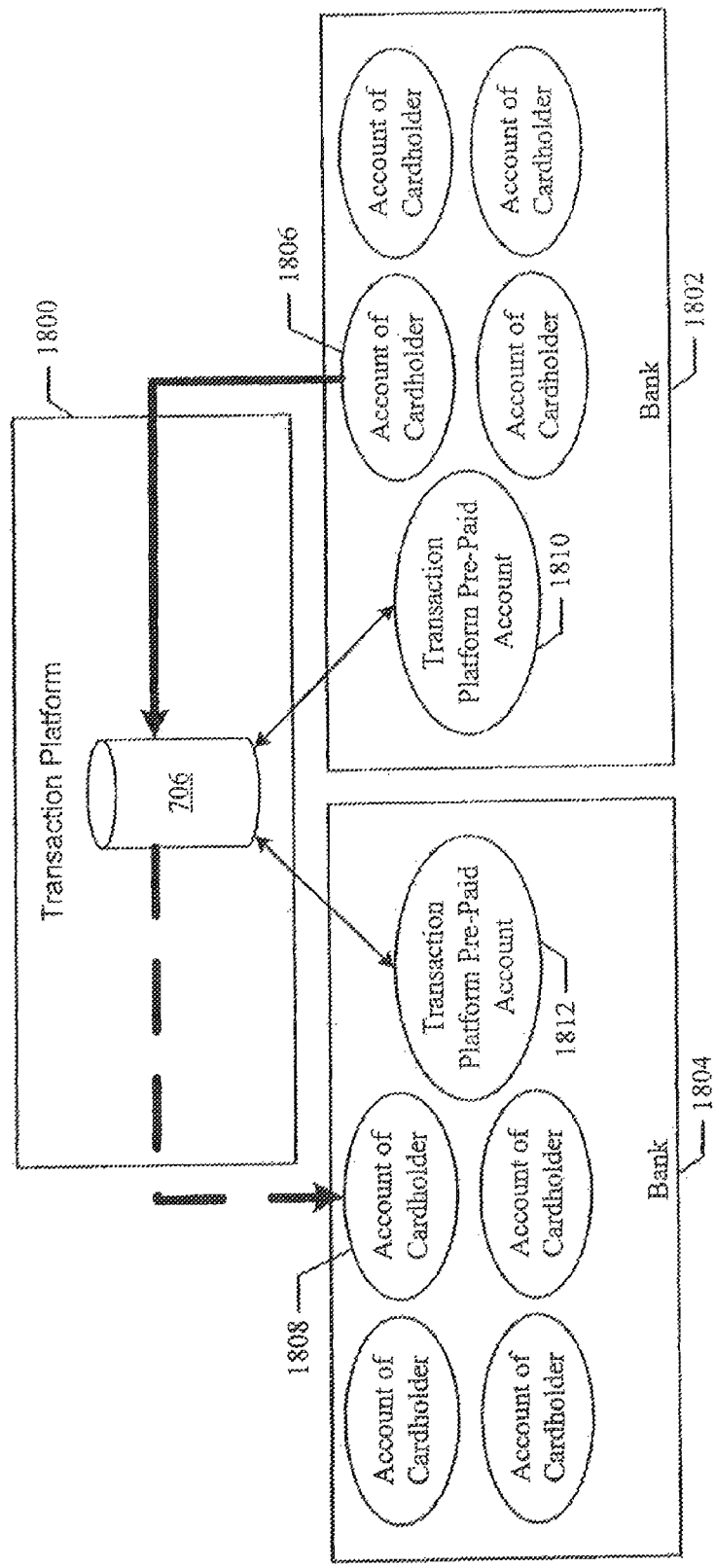
FIG. 18 depicts another exemplary embodiment of a person-to-person exchange of funds.

FIG. 18 depicts one exemplary embodiment of a person-to-person transaction, as just discussed. As shown in FIG. 18, the transaction platform 1800 extends access to monetary funds (line of credit, debit account, checking account, savings account, stored value, and/or pre-paid account) through each of two banks 1802 and 1804. In principle, the platform 1800 may extend access to funds through any number of banks. For the sake of illustration, a person-to-person transfer of fund is described with reference to transfer from a credit card. Transfer of funds may be executed from any type of account to any type of account. Again, for the sake of illustration only, it is assumed that the transaction platform handles eight parties, each of which own a transaction card that functions as a credit card. Four of the cardholders access a line of credit through bank 1802, while the other tour access a line of credit through bank 1804. Thus, as shown in FIG. 18, an account is maintained for each cardholder by each card-issuing bank 1802 and 1804. One such account is identified by reference numeral 1806, and another such account is identified by reference numeral 1808.

Assuming that the cardholder associated with credit account 1806 wishes to transfer funds to the party associated with account 1808, such funds may be made instantly available to the party associated with account 1808. The transaction platform maintains an account 1810 and 1812 at each bank 1802 and 1804. All cardholders having accounts at bank 1802 have the funds of their pre-paid accounts stored in account 1810, while all cardholders having accounts at bank 1804 have the funds of their pre-paid accounts stored in account 1812. The platform maintains a database 706 that keeps track of each cardholder's share of the funds held in the pre-paid accounts 1810 and 1812. A transfer from a credit account 1806 to the cardholder associated with credit account 1808 is transferred from credit account 1806 to the pre-paid account 1812, and the database 1706 is immediately updated to: (1) reflect that the account 1812 is incremented by the monetary sum being transferred; and (2) reflect that the cardholder associated with credit account 1808 has a share of the pre-paid account that is incremented by the monetary sum being transferred. Thus, the cardholder associated with monetary account 1808 may immediately draw his portion from the pre-paid account 1812, e.g., may conduct a purchase of a good or service by transacting such purchase as a pre-paid transaction, meaning that the funds are withdrawn from that pre-paid account 1812, and the database 706 is immediately updated to reflect such transaction. Alternatively, the cardholder associated with credit account 1808 may specify that the received funds be transferred to his credit account 1808, or any other account. Such transfer is then completed, for example, at the end of the day when the database 706 and the banks 1804 computer system are synchronized, in order to reflect that the monetary sum is to be withdrawn from the pre-paid account 1812 and deposited into the credit account 1808.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A system comprising:
   a dispute resolution processor,
   a memory configured to communicate with the processor, the memory having instructions stored thereon that, in response to execution by the processor, cause the processor to perform operations comprising:
   obtaining, by the processor, information identifying a transaction and a plurality of items associated with the transaction;
   associating, by the processor, the plurality of items with a transaction identifier; and
   disputing, by the processor and in response to a dispute request, a cost for a first item in the plurality of items, without subjecting costs of any other of the plurality of items to dispute.

2. The system of claim 1, further comprising receiving a transaction request associated with the transaction.

3. The system of claim 2, wherein the transaction request comprises item information associated with the plurality of items.

4. The system of claim 3, wherein the item information comprises a stock keeping unit (SKU).

5. The system of claim 3, wherein the transaction request is received from a point-of-sale device.

6. The system of claim 5 wherein the point-of-sale device is at least one of: a cash register that is physically located within a merchant store and a web site structured to conduct on-line commerce.

7. The system of claim 2, wherein the transaction request comprises the transaction identifier.

8. The system of claim 2, further comprising, in response to the receiving the transaction request, creating the transaction identifier.

9. The system of claim 2, further comprising authorizing the transaction based upon the transaction request.

10. The system of claim 9, further comprising receiving, in response to the authorizing, item information associated with the plurality of items.

11. The system of claim 2, wherein the transaction request comprises a transaction account identifier associated with a transaction account.

12. The system of claim 11, wherein the transaction account is at least one of a credit account, a charge account, a debit account, and a stored value account.

13. The system of claim 11, wherein the transaction account is associated with a transaction device.

14. The system of claim 13, wherein the transaction device is an anonymous card.

15. The system of claim 1, further comprising storing a transaction identifier and at least a subset of the item information in a database.

16. The system of claim 1, wherein the dispute request comprises at least one of an identification of the first item and a cost associated with the first item.

17. The system of claim 16, further comprising removing a disputed cost from a balance of a transaction account, wherein the transaction account is associated with the transaction.

18. The system of claim 1, wherein each item in the plurality of items comprises at least one of a good, service, information, experience, data, content, access, rental, lease, contribution, account, credit, debit, benefit, right, reward, points, coupons, credits, monetary equivalent, anything of value, something of minimal or no value, monetary value, and non-monetary value.

19. A computer-based method, comprising:
  obtaining, by a dispute resolution computer, information identifying a transaction and a plurality of items associated with the transaction;
  associating, by the computer, the plurality of items with a transaction identifier; and
  disputing, by the computer and in response to a dispute request, a cost for a first item in the plurality of items, without subjecting costs of any other of the plurality of items to dispute.

20. A non-transitory computer-readable storage medium having computer-executable instructions stored thereon that, in response to execution by a dispute resolution computer, causes the computer perform a operations comprising:
  obtaining, by the computer, information identifying a transaction and a plurality of items associated with the transaction;
  associating, by the computer, the plurality of items with a transaction identifier; and
  disputing, by the computer and in response to a dispute request, a cost for a first item in the plurality of items, without subjecting costs of any other of the plurality of items to dispute.

* * * * *